United States Patent
Luo et al.

(10) Patent No.: US 12,468,404 B2
(45) Date of Patent: Nov. 11, 2025

(54) HANDWRITING PROCESSING METHOD, TERMINAL DEVICE, AND CHIP SYSTEM TO STOP DISPLAYING TO-BE-DISPLAYED HANDWRITING CONTENT

(71) Applicant: HONOR DEVICE CO., LTD., Shenzhen (CN)

(72) Inventors: Hongxia Luo, Shenzhen (CN); Hang Li, Shenzhen (CN); Hongzheng Tian, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/577,943

(22) PCT Filed: Mar. 27, 2023

(86) PCT No.: PCT/CN2023/084046
§ 371 (c)(1),
(2) Date: Jan. 9, 2024

(87) PCT Pub. No.: WO2024/093103
PCT Pub. Date: May 10, 2024

(65) Prior Publication Data
US 2025/0093977 A1    Mar. 20, 2025

(30) Foreign Application Priority Data
Nov. 4, 2022 (CN) .......................... 202211374510.6

(51) Int. Cl.
*G06F 3/0354*     (2013.01)
*G06F 3/041*      (2006.01)
*G06F 3/04883*    (2022.01)

(52) U.S. Cl.
CPC ...... *G06F 3/03545* (2013.01); *G06F 3/04146* (2019.05); *G06F 3/04162* (2019.05); *G06F 3/04883* (2013.01)

(58) Field of Classification Search
CPC ............. G06F 3/03545; G06F 3/04162; G06F 3/04146; G06F 3/04883; G06F 3/041;
(Continued)

(56) References Cited

U.S. PATENT DOCUMENTS

| 6,167,439 A | 12/2000 | Levine et al. |
| 9,329,706 B2 | 5/2016 | Kawasaki et al. |

(Continued)

FOREIGN PATENT DOCUMENTS

| CN | 202142045 U | 2/2012 |
| CN | 102455870 A | 5/2012 |

(Continued)

*Primary Examiner* — Richard J Hong
(74) *Attorney, Agent, or Firm* — WOMBLE BOND DICKINSON (US) LLP

(57) ABSTRACT

Embodiments of this application disclose a handwriting processing method, a terminal device, and a chip system, and are applied to the field of data processing technologies. The method includes: identifying, based on a first pressure value within a preset time range and a latest first signal strength, whether a stylus moves away from a handwriting module; stopping, when the stylus moves away from the handwriting module, displaying to-be-displayed handwriting content inputted by the stylus on the handwriting module within a first time range after a current moment; or stopping responding to several target coupling signals.

17 Claims, 15 Drawing Sheets

(58) Field of Classification Search
CPC ...... G06F 3/0447; G06F 3/044; G06F 3/0418; G06F 3/0446; G06F 3/0442
See application file for complete search history.

(56) References Cited

U.S. PATENT DOCUMENTS

| | | | |
|---|---|---|---|
| 2013/0257793 A1* | 10/2013 | Zeliff | G06F 3/0447 345/173 |
| 2015/0015541 A1 | 1/2015 | Kan et al. | |
| 2015/0035782 A1* | 2/2015 | Kawasaki | G06F 3/041 345/173 |
| 2015/0177868 A1* | 6/2015 | Morein | G06F 3/03545 345/174 |
| 2017/0255282 A1* | 9/2017 | Winebrand | G06F 3/0446 |
| 2017/0255328 A1* | 9/2017 | Zyskind | G06F 3/0418 |
| 2018/0024656 A1* | 1/2018 | Kim | G06F 3/03545 345/174 |
| 2019/0235649 A1* | 8/2019 | Oyama | G06F 3/0442 |
| 2022/0137729 A1 | 5/2022 | Zou et al. | |

FOREIGN PATENT DOCUMENTS

| | | |
|---|---|---|
| CN | 102707816 A | 10/2012 |
| CN | 102890565 A | 1/2013 |
| CN | 103064577 A | 4/2013 |
| CN | 104281332 A | 1/2015 |
| CN | 110007784 A | 7/2019 |
| CN | 111290665 A | 6/2020 |
| CN | 111391541 A | 7/2020 |
| CN | 113672099 A | 11/2021 |
| CN | 114255470 A | 3/2022 |
| CN | 114461129 A | 5/2022 |
| CN | 115421603 A | 12/2022 |
| CN | 115421603 B | 4/2023 |
| KR | 20110127555 A | 11/2011 |

\* cited by examiner

HANDWRITING PROCESSING METHOD, TERMINAL DEVICE, AND CHIP SYSTEM TO STOP DISPLAYING TO-BE-DISPLAYED HANDWRITING CONTENT

CROSS-REFERENCE TO RELATED APPLICATIONS

This application is a national stage of International Application No. PCT/CN2023/084046, filed on Mar. 27, 2023, which claims priority to Chinese Patent application Ser. No. 20/221,1374510.6, filed on Nov. 4, 2022. The disclosures of both of the aforementioned applications are hereby incorporated by reference in their entireties.

TECHNICAL FIELD

This application relates to the field of stylus technologies, and specifically, to a handwriting processing method, a terminal device, and a chip system.

BACKGROUND

A stylus (also referred to as a stylus or an active pen) is a device configured to write on a terminal device. During actual application, when a user uses the stylus to write on a screen of a terminal device, a certain delay may exist from a time point at which the user applies force to the stylus to a time point at which the terminal device displays a corresponding handwriting on the screen. In a process that the user stops writing and moves the stylus away from the screen of the terminal device, a problem that the handwriting does not disappear in time may be caused on the terminal device due to the delay. As a result, even if the stylus has moved away from the screen, a new handwriting still continues to be displayed on the screen of the terminal device.

The handwriting of the stylus does not disappear in time, and as a result, use experience of the stylus and the terminal device by the user is reduced. Therefore, how to resolve or alleviate the situation that the handwriting of the stylus does not disappear in time is a problem that needs to be resolved during actual application.

SUMMARY

Embodiments of this application provide a handwriting processing method, a terminal device, and a chip system, so that a problem that a handwriting of a stylus does not disappear in time may be alleviated.

According to a first aspect of the embodiments of this application, a handwriting processing method is provided, applied to a terminal device, the terminal device including a handwriting module, the handwriting module being provided for a stylus to input handwriting content, and the method including:
obtaining a first pressure value within a preset time range and latest first signal strength; identifying, based on the first pressure value and the first signal strength, whether the stylus moves away from the handwriting module; and stopping, when identifying that the stylus moves away from the handwriting module, displaying to-be-displayed handwriting content inputted by the stylus on the handwriting module within a first time range after a current moment, or stopping responding to several target coupling signals, where the target coupling signals are coupling signals that are obtained after the current moment between the stylus and the terminal device. The first pressure value is a pressure value applied by a user to the stylus or a pressure value applied by the stylus to the handwriting module, and an end moment of the preset time range is the current moment. The first signal strength is a signal strength of a coupling signal between the terminal device and the stylus;

In a stylus removing process of the user, force applied by the stylus is reduced (that is, the force is released), so that a magnitude of the pressure value within this period of time may be considered as a feature of stylus removing. In addition, during actual application, a signal quantity of the coupling signal decreases as a distance between the stylus and the handwriting module increases. Therefore, whether the stylus moves away from the handwriting module may be identified based on the obtained pressure value and the obtained signal quantity, and when identifying that the stylus moves away from the handwriting module, the terminal device chooses not to display handwriting content within a specific subsequent range. Therefore, the handwriting may disappear in time at the first time when the stylus moves away from the handwriting module, to alleviate or even avoid the situation that the handwriting of the stylus does not disappear in time.

In a first possible implementation of the first aspect, the identifying, based on the first pressure value and the first signal strength, whether the stylus moves away from the handwriting module includes:
detecting a change trend of the first pressure value within the preset time range; and determining, when the detected change trend is descending and the first signal strength is less than or equal to a target critical threshold, that the stylus moves away from the handwriting module.

In the stylus removing process of the user, the force applied to the stylus is in a decreasing change trend, so that a decreasing trend of the pressure value may be considered as a feature of stylus removing. In a process that the pressure value decreases, the signal quantity is reduced to be less than or equal to the target critical threshold, this indicates that the stylus removing operation has reached a state that a stylus tip moves away from the handwriting module. That is, in this case, the stylus has moved away from the handwriting module. In this way, separation of the stylus from the handwriting module is identified quickly and accurately.

In a second possible implementation of the first aspect, the handwriting module includes a plurality of regions.

Before the operation of identifying, based on the first pressure value and the first signal strength, whether the stylus moves away from the handwriting module, the method further includes: determining a region in which the stylus is located on the handwriting module at the current moment, using the region as a first region, and obtaining a target critical threshold associated with the first region.

In this embodiment of this application, the handwriting module is divided into a plurality of regions, and associated critical thresholds are respectively set for different regions. Therefore, the critical threshold in this embodiment of this application may effectively adapt to different actual situations at different positions of the handwriting module. Therefore, a state that the stylus tip moves away from the handwriting module is identified more accurately in this embodiment of this application.

In a third possible implementation of the first aspect, when the target critical threshold associated with the first region is not obtained, a critical threshold associated with each region within a preset region range adjacent to the first region is searched; and the target critical threshold corresponding to the first region is determined based on one or more found critical thresholds.

In this embodiment of this application, when a critical threshold of a region in which the stylus is not directly obtained, critical threshold searching is actively performed on surrounding regions, and a critical threshold used in this time is determined based on found critical thresholds. Situations of adjacent regions of the handwriting module are similar. Therefore, in this embodiment of this application, in a case that a current region is not associated with a critical threshold, a preferred critical threshold may still be obtained for use, which has certain adaptability to various possible situations.

In a fourth possible implementation of the first aspect, the determining the target critical threshold corresponding to the first region based on one or more found critical thresholds includes:

screening, when critical thresholds associated with a plurality of regions are found within the preset region range, out a second region that is closest to the first region from the plurality of found regions;
  using, when one second region is screened out, a critical threshold associated with the second region as the target critical threshold corresponding to the first region; and using, when a plurality of second regions are screened out, a mean value of critical thresholds associated with all the second regions as the target critical threshold corresponding to the first region.

In this embodiment of this application, a most suitable critical threshold may be adaptively determined based on a search result. Therefore, this embodiment of this application effectively copes with various possible situations of the critical threshold, which has strong adaptability and compatibility to the various possible situations, and the validity of the obtained critical threshold may be improved.

In a fifth possible implementation of the first aspect, a manner for determining the target critical threshold includes:

obtaining a latest second pressure value, a latest second signal strength, and a latest target tilt angle between the stylus and the handwriting module, where the second pressure value is a pressure value applied by the user to the stylus or a pressure value applied by the stylus to the handwriting module, and the second signal strength is a signal strength of a coupling signal between the terminal device and the stylus;
  obtaining a mapping relationship among a pressure value, a tilt angle, and a signal strength, and determining a residual signal strength based on the second pressure value, the target tilt angle, and the mapping relationship; and
  removing the residual signal strength from the second signal strength to obtain an initial signal strength, and determining the target critical threshold based on the initial signal strength.

In this embodiment of this application, influence of the force applied by the user to the stylus on the signal quantity may be effectively eliminated, and influence of a content area between the stylus tip of the stylus and the screen on the signal quantity may also be effectively eliminated. Therefore, an obtained initial signal quantity may be more close to an actual signal quantity in a state that the stylus is just separated from the screen. The critical threshold is then determined based on the initial signal quantity, so that the validity of the critical threshold may be improved, and the accuracy in identifying separation of the stylus and the handwriting module may be improved. In addition, in this embodiment of this application, in a process that the user normally uses the stylus to write on the handwriting module, a suitable critical threshold may be obtained through self-adaptive learning. Compared with setting a fixed critical threshold, this embodiment of this application may effectively adapt to various different terminal device situations and stylus situations, and the critical threshold may be updated in time as the terminal device situation and the stylus situation change. Therefore, the critical threshold obtained in this embodiment of this application has stronger adaptability and high flexibility to an actual application situation, and the validity of the critical threshold is high.

In an embodiment of this application, the mapping relationship is a linear function relationship.

In a sixth possible implementation of the first aspect, the handwriting module includes the plurality of regions, and a manner for determining the target critical threshold includes:

obtaining a latest second pressure value, a latest second signal strength, and a latest target tilt angle between the stylus and the handwriting module, where the second pressure value is a pressure value applied by the user to the stylus or a pressure value applied by the stylus to the handwriting module, and the second signal strength is a signal strength of a coupling signal between the terminal device and the stylus;
  determining a region in which the stylus is located on the handwriting module at the current moment, and using the region as a second region;
  obtaining a mapping relationship associated with the second region, and determining a residual signal strength based on the second pressure value, the target tilt angle, and the mapping relationship, where the mapping relationship is a mapping relationship among a pressure value, a tilt angle, and a signal strength; and
  removing the residual signal strength from the second signal strength to obtain an initial signal strength, and determining a target critical threshold associated with the second region based on the initial signal strength.

This embodiment of this application has all beneficial effects of the fifth possible implementation of the first aspect. In addition, in this embodiment of this application, the critical threshold is learned in a region division manner, so that the critical threshold may be distinguished and learned in a more detailed manner. Therefore, the obtained critical threshold may better adapt to different regions in a same screen, so that when the terminal device subsequently uses the critical threshold to determine whether the stylus moves away from the screen, a determination result is more accurate and reliable. Therefore, according to this embodiment of this application, the validity of the obtained critical threshold may be further improved.

In a seventh possible implementation of the first aspect, the mapping relationship is a function relationship among a pressure value, a tilt angle, and a signal quantity.

In an eighth possible implementation of the first aspect, the detecting a change trend of the first pressure value within the preset time range includes:

comparing, by using every two adjacent first pressure values in all first pressure values obtained within the preset time range as a unit, every two adjacent first pressure values respectively;
  counting, when comparison results comprise first-type results and second-type results, a quantity of the first-type results, and obtaining a difference between two adjacent first pressure values in each second-type result; and determining that the change trend is descending if the quantity of the first-type results is greater than a preset decreasing threshold and differences corresponding to all the second-type results are less than a preset sudden change threshold, where the first-type result refers to that a pressure value obtained at a former time point is greater than a pressure value obtained at a later time point in two adjacent first pressure values, and the second-type result refers to that a pressure value obtained at a former time point is less than or equal to a pressure value obtained at a later time point in two adjacent first pressure values.

According to this embodiment of this application, on one hand, whether the pressure value is in a decreasing trend may be normally identified, and on the other hand, interference from some noise data may also be tolerated. In addition, the change trend may still be accurately identified as a decreasing trend when the noise appears, therefore, a strong anti-interference capability is provided.

In a ninth possible implementation of the first aspect, the detecting a change trend of the first pressure value within the preset time range includes:

performing function fitting on a plurality of pressure values obtained with the preset time range to obtain a corresponding pressure change function; and determining, if the pressure change function is a decreasing function, that the change trend of the first pressure value is descending.

Through function fitting, an entire change trend of the pressure value may be better reflected, thereby improving the accuracy in identifying the change trend.

According to a second aspect of the embodiments of this application, a critical threshold learning method is provided, applied to a terminal device, the terminal device including a handwriting module, and the method including:

obtaining a latest second pressure value, a latest second signal strength, and a latest target tilt angle between a stylus and the handwriting module, where the second pressure value is a pressure value applied by a user to the stylus or a pressure value applied by the stylus to the handwriting module, and the second signal strength is a signal strength of a coupling signal between the terminal device and the stylus;

obtaining a mapping relationship among a pressure value, a tilt angle, and a signal strength, and determining a residual signal strength based on the second pressure value, the target tilt angle, and the mapping relationship; and removing the residual signal strength from the second signal strength to obtain an initial signal strength, and determining a target critical threshold based on the initial signal strength, where the target critical threshold is used for performing comparison with a first signal strength of a latest coupling signal between the terminal device and the stylus, to identify whether the stylus moves away from the handwriting module.

In this embodiment of this application, influence of the force applied by the user to the stylus on the signal quantity may be effectively eliminated, and influence of a content area between the stylus tip of the stylus and the screen on the signal quantity may also be effectively eliminated. Therefore, an obtained initial signal quantity may be more close to an actual signal quantity in a state that the stylus is just separated from the screen. The critical threshold is then determined based on the initial signal quantity, so that the validity of the critical threshold may be improved, and the accuracy in identifying separation of the stylus and the handwriting module may be improved. In addition, in this embodiment of this application, in a process that the user normally uses the stylus to write on the handwriting module, a suitable critical threshold may be obtained through self-adaptive learning. Compared with setting a fixed critical threshold, this embodiment of this application may effectively adapt to various different terminal device situations and stylus situations, and the critical threshold may be updated in time as the terminal device situation and the stylus situation change. Therefore, the critical threshold obtained in this embodiment of this application has stronger adaptability and high flexibility to an actual application situation, and the validity of the critical threshold is high. Comparison is then performed with a first signal strength of a latest coupling signal based on the target critical threshold obtained through learning, to identify whether the stylus moves away from the handwriting module, so that the identification accuracy may be effectively improved.

In a first possible implementation of the second aspect, the handwriting module includes a plurality of regions; the obtaining a mapping relationship among a pressure value, a tilt angle, and a signal strength includes:

determining a region in which the stylus is located on the handwriting module at a current moment, and using the region as a second region; and obtaining a mapping relationship associated with the second region, where the mapping relationship is a mapping relationship among a pressure value, a tilt angle, and a signal strength; and the determining a target critical threshold based on the initial signal strength includes:

determining a target critical threshold associated with the second region based on the initial signal strength.

In this embodiment of this application, the critical threshold is learned in a region division manner, so that the critical threshold may be distinguished and learned in a more detailed manner. Therefore, the obtained critical threshold may better adapt to different regions in a same screen, so that when the terminal device subsequently uses the critical threshold to determine whether the stylus moves away from the screen, a determination result is more accurate and reliable. Therefore, according to this embodiment of this application, the validity of the obtained critical threshold may be further improved.

In an embodiment of this application, the mapping relationship is a linear function relationship.

According to a third aspect of the embodiments of this application, a handwriting processing apparatus is provided, the handwriting processing apparatus including a handwriting module, the handwriting module being provided for a stylus to input handwriting content, and the handwriting processing apparatus including:

a pressure obtaining module, configured to obtain a first pressure value within a preset time range, where the first pressure value is a pressure value applied by a user to the stylus or a pressure value applied by the stylus to the handwriting module, and an end moment of the preset time range is a current moment;

a signal quantity obtaining module, configured to obtain a latest first signal strength, where the first signal strength is a signal strength of a coupling signal between the terminal device and the stylus;

an identification module, configured to identify, based on the first pressure value and the first signal strength, whether the stylus moves away from the handwriting module; and a display control module, configured to stop, when identifying that the stylus moves away from the handwriting module, displaying to-be-displayed handwriting content inputted by the stylus on the handwriting module within a first time range after the current moment, or stop responding to several target coupling signals, where the target coupling signals are coupling signals that are obtained after the current moment between the stylus and the terminal device.

In an embodiment of this application, the handwriting processing apparatus may further implement the method according to any one of the first aspect.

According to a fourth aspect of the embodiments of this application, a critical threshold learning apparatus is provided, the critical threshold learning apparatus including a handwriting module, and the critical threshold learning apparatus including:

a data obtaining module, configured to obtain a latest second pressure value, a latest second signal strength, and a latest target tilt angle between a stylus and the handwriting module, where the second pressure value is a pressure value applied by a user to the stylus or a pressure value applied by the stylus to the handwriting module, and the second signal strength is a signal strength of a coupling signal between the terminal device and the stylus;

a mapping obtaining module, configured to obtain a mapping relationship among a pressure value, a tilt angle, and a signal strength;

a residual calculation module, configured to determine a residual signal strength based on the second pressure value, the target tilt angle, and the mapping relationship;

a residual removing module, configured to remove the residual signal strength from the second signal strength to obtain an initial signal strength; and a threshold determining module, configured to determine a target critical threshold based on the initial signal strength, where the target critical threshold is used for performing comparison with a first signal strength of a latest coupling signal between the terminal device and the stylus, to identify whether the stylus moves away from the handwriting module.

In an embodiment of this application, the critical threshold learning apparatus may further implement the method according to any one of the second aspect.

According to a fifth aspect, an embodiment of this application provides a terminal device, including a memory, a processor, and a computer program stored in the memory and executable on the processor, where the processor, when executing the computer program, implements the method according to any one of the first aspect or the method according to any one of the second aspect.

According to a sixth aspect, an embodiment of this application provides a computer-readable storage medium, the computer-readable storage medium storing a computer program, where when the computer program is executed by a processor, the method according to any one of the first aspect or the method according to any one of the second aspect is implemented.

According to a seventh aspect, an embodiment of this application provides a chip system. The chip system includes a processor, and the processor is coupled to a memory and executes a computer program stored in the memory, to implement the method according to any one of the first aspect or the method according to any one of the second aspect. The chip system may be a single chip or a chip module including a plurality of chips.

According to an eighth aspect, an embodiment of this application provides a computer program product. When the computer program product runs on a terminal device, the terminal device is caused to perform the method according to any one of the first aspect or the method according to any one of the second aspect.

It may be understood that, for beneficial effects of the third aspect to the eighth aspect, refer to the related descriptions in the first aspect and the second aspect, and details are not described herein again.

DESCRIPTION OF EMBODIMENTS

Figure 1A:
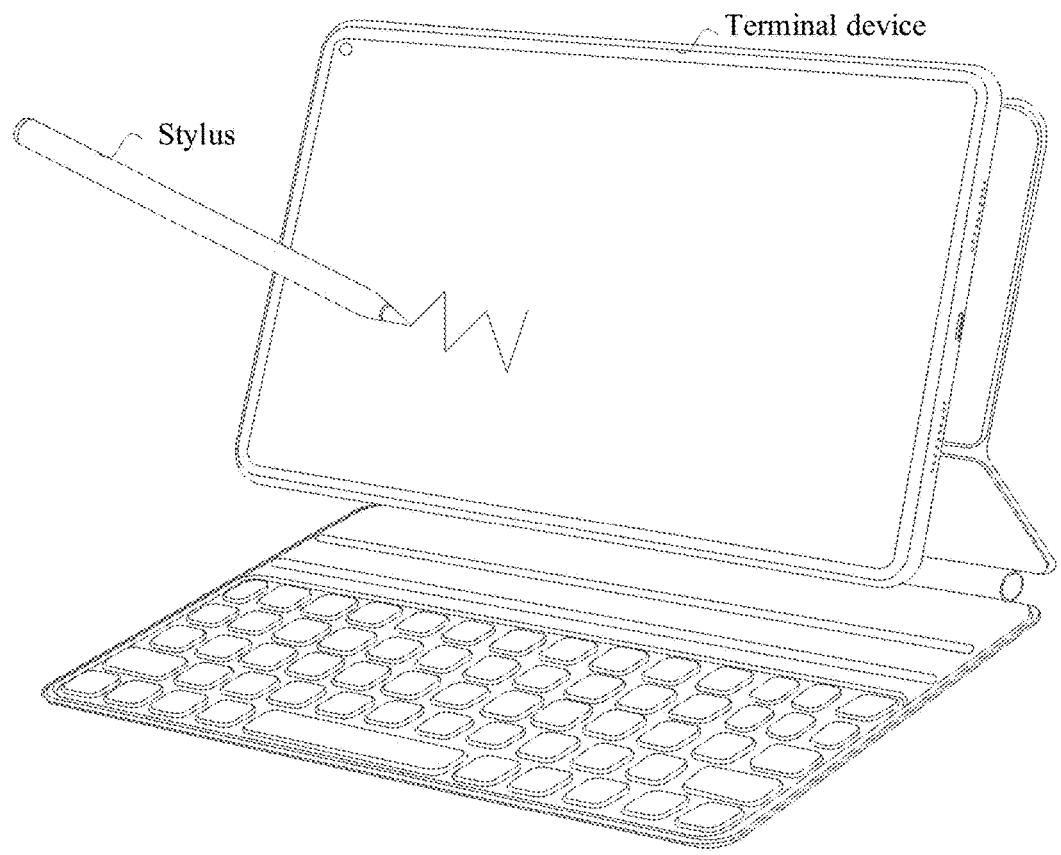
FIG. 1A is a schematic diagram of a scenario in which a stylus writes on a screen of a terminal device according to an embodiment of this application.

Technical solutions in this application will be described below with reference to the accompanying drawings.

In the following descriptions, for the purpose of illustration rather than limitation, specific details such as a specific system structure and a technology are proposed, to provide a thorough understanding of embodiments of this application. However, a person skilled in the art should understand that this application may also be implemented in other embodiments without these specific details. In other cases, detailed descriptions of well-known systems, apparatuses, circuits, and methods are omitted to prevent unnecessary details from obscuring descriptions of this application.

Some concepts that may be involved in this application are described below:

Plurality of: In the embodiments of this application, a plurality of means two or more than two.

Coupling signal and signal quantity: In the embodiments of this application, a coupling signal is a signal generated based on a coupling manner between a stylus and a terminal device. The coupling signal may be used by the terminal device to draw a handwriting, and for example, the terminal device may determine a thickness and a depth of the handwriting based on a signal strength of the coupling signal. A type of the coupling signal needs to be determined based on an actual coupling manner between the stylus and the terminal device. For example, in some embodiments, when the coupling manner between the stylus and the terminal device is capacitive coupling, and the stylus is a capacitive stylus, the coupling signal may be a capacitive signal; when the coupling manner between the stylus and the terminal device is electromagnetic coupling, and the stylus is an electromagnetic stylus, the coupling signal may be an electromagnetic signal; and when the coupling manner between the stylus and the terminal device is detecting an operation of the stylus through resistance, and the stylus is a resistive stylus, the coupling signal may be a resistive signal.

In the embodiments of this application, a signal quantity is used for indicating a magnitude of a signal strength of the coupling signal between the terminal device and the stylus. Based on this, the signal quantity may be an actual signal strength value of the coupling signal, or may be a quantized value after conversion in a specific rule is performed on the signal strength of the coupling signal. Types of coupling signals corresponding to different coupling manners are different, so that actual physical units of corresponding signal quantities may also be different. For ease of description, in the embodiments of this application, a description is provided by using an example in which the signal quantity is a pure value. For example, in some embodiments, the signal quantity may be n, where n is any positive number. A specific physical unit corresponding to the signal quantity may be determined based on a coupling manner that is actually used, and is not particularly described in the embodiments of this application.

The following embodiments of this application are all described by using an example in which the signal quantity indicates the signal strength of the coupling signal. That is, the signal quantity in each embodiment may also be replaced with the signal strength.

Handwriting module: This is hardware that may use a stylus to write in a terminal device, so that the stylus may input handwriting content in the handwriting module through a writing manner. According to different types of the terminal device, specific hardware corresponding to the handwriting module may also be different. For example, for some terminal device whose screen supports writing by a stylus, the screen may be used as a handwriting module of the terminal device, for example, a common smartphone and a tablet computer. In another example, for a terminal device such as a writing pad or a drawing board that includes hardware other than a screen supporting writing by the stylus, the hardware supporting writing by the stylus may also be used as a handwriting module of the terminal device.

The stylus is a device configured to write on a terminal device, and a user may use the stylus to perform an operation such as touch, write, or draw on the terminal device. With the continuous popularization of smart terminal devices such as a mobile phone, a tablet computer, and a notebook, requirements and use scenarios of the user on the stylus are increasingly richer. For example, refer to FIG. 1A, which is a schematic diagram of a possible scenario in which a stylus writes on a screen of a terminal device.

The stylus may include a resistive stylus and an inductive stylus when classified based on a working principle, where the inductive stylus may be further classified into an electromagnetic stylus and a capacitive stylus. When the terminal device uses styli in different working principles to write, in order to display a handwriting of the stylus in the screen, data that needs to be obtained and data obtaining manners may also be different. Generally, coordinate information during writing of the stylus and a pressure value to the handwriting module need to be obtained. The coordinate information is used for positioning a handwriting display position, which may be detected by the terminal device. The pressure value may be used by the terminal device to determine whether the stylus moves away from the handwriting module (that is, whether the stylus is removed), and the pressure value may be detected by the stylus and sent to the terminal device in a communication manner such as code marking or Bluetooth. In an actual application process, after obtaining the coordinate information and the pressure value, the terminal device may perform corresponding handwriting parsing and displaying; and If the terminal device obtains the coordinate information but does not obtain the pressure value, it may be determined that the stylus is removed. In this case, the handwriting may not be displayed, and a state such as a cursor is displayed.

During actual application, when a user uses the stylus to write on the handwriting module of the terminal device, there are some main steps from a time point at which the user applied force to the stylus to a time point at which the terminal device displays a corresponding handwriting on the screen. In this case, refer to FIG. 1B, which is a schematic diagram of a delay of each step in a handwriting display process according to an embodiment of this application. Detailed descriptions are as follows:

1. The user applies certain force to or release force from the stylus. In this case, the stylus may be in a normal state of writing on the handwriting module of the terminal device, or may be in a state of moving or having already moved away from the handwriting module. A pressure sensor of the stylus may detect the force applied by the user, but due to a sensibility limitation of the pressure sensor, a detection delay of T1 time exists in force detection in this case.

2. After the pressure sensor detects pressure data, the stylus needs to parse the pressure data to obtain a corresponding pressure value. In this case, under influence of factors such as a pressure sampling period and a priority that the stylus controls a processor to process pressure, a pressure parsing delay of T2 time exists.

3. The stylus sends, in a communication manner such as code marking or Bluetooth, the pressure value and other required data (for example, a coupling signal) to the terminal device. In this case, a transmission delay of T3 time exists. A specific communication manner needs to be determined based on an actual situation.

4. After receiving the pressure value and other data, the terminal device performs corresponding data processing on the data such as the pressure value, and then displays the corresponding handwriting on the screen. In this case, due to limitations of factors such as a processing capability of the processor of the terminal device, a display delay of T4 time exists.

Figure 1B:
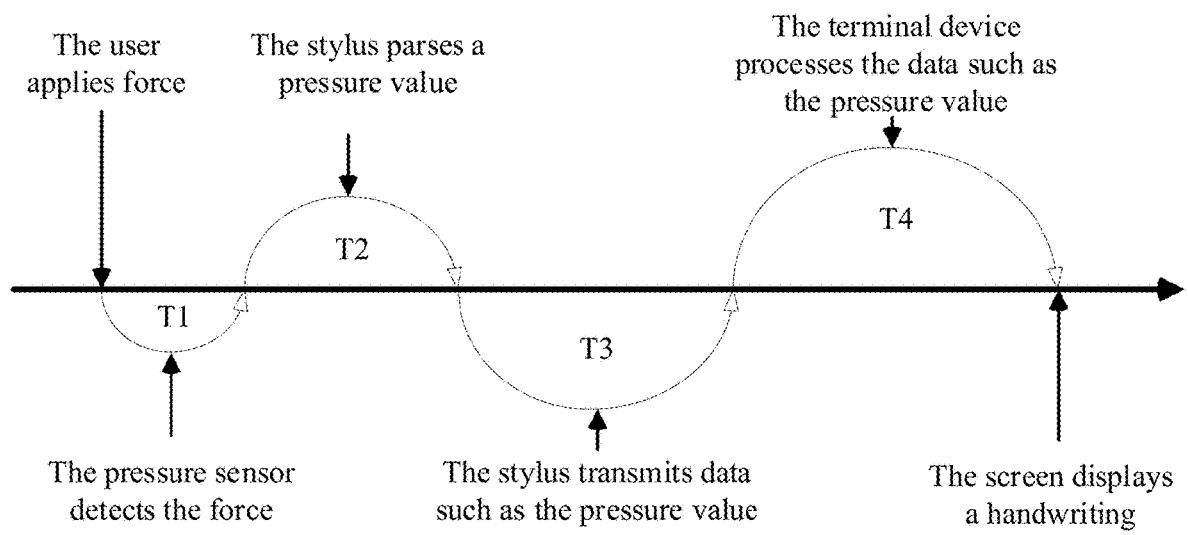
FIG. 1B is a schematic diagram of a delay of each step in a handwriting display process according to an embodiment of this application.
Figure 1C:
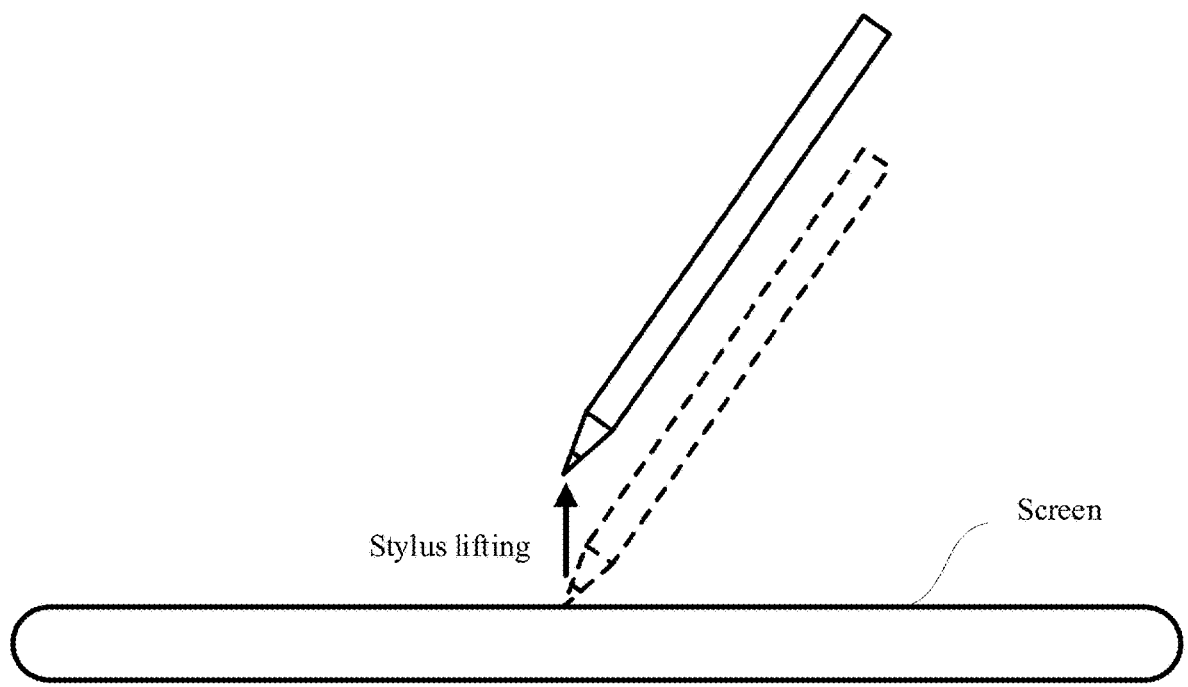
FIG. 1C is a schematic diagram of a stylus removing scenario according to an embodiment of this application.

As can be learned from the analyses and descriptions of the steps in FIG. 1B, in the process from the time point at which the user applies force to the stylus to the time point at which the terminal device displays a corresponding handwriting on the screen, delays of T1 to T4 may exist. As a result, display of the handwriting by the terminal device may lag behind an operation actually performed by the user on the stylus. Based on this, refer to FIG. 1C, which is a schematic diagram of a stylus removing scenario according to an embodiment of this application. Refer to FIG. 1C, in a process that the user takes the stylus away from the screen of the terminal device (also referred to as stylus lifting or stylus removing), when the stylus moves away from the screen, the force applied by the user to the stylus is changed to 0. However, due to existence of the delays of T1 to T4, time at which the terminal device receives the pressure value may lag behind. As a result, in a small period of time after the stylus moves away from the handwriting module, the terminal device may still obtain the coordinate information and the pressure value, and the terminal device may continue to display the handwriting in a delayed manner. Therefore, during actual application, in a stylus removing process of the stylus, the handwriting may not disappear in time in the terminal device.

Figure 1D:
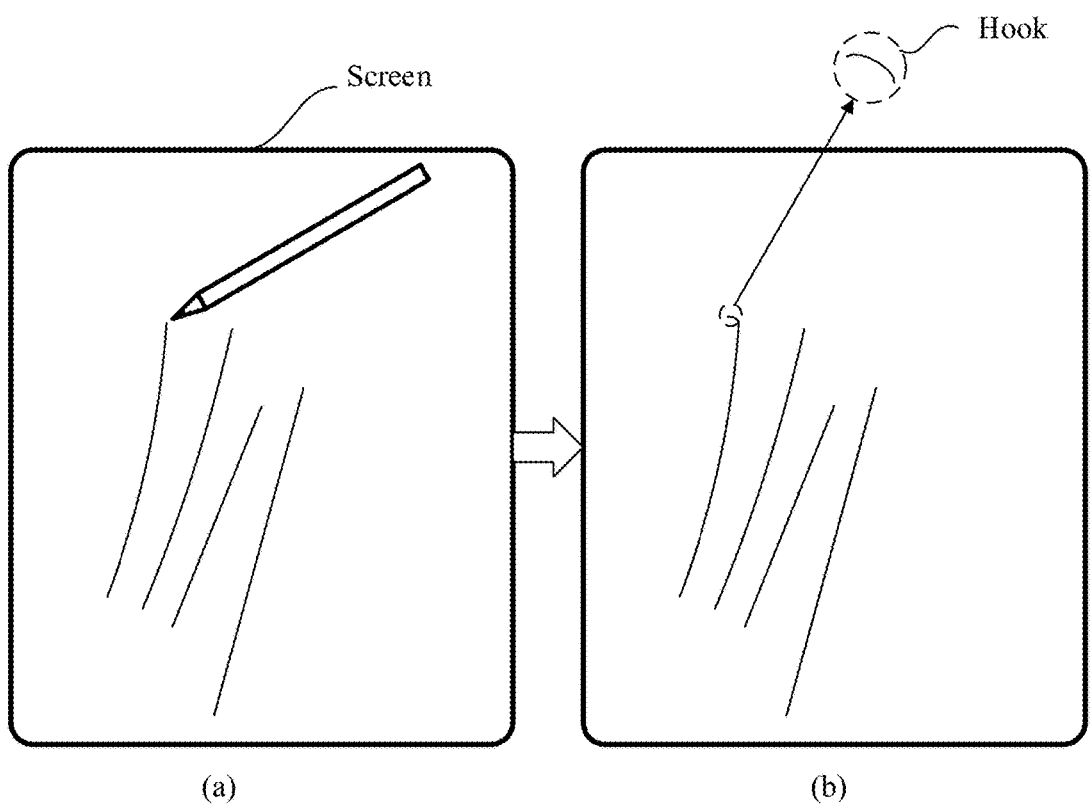
FIG. 1D is a schematic diagram of a scenario in which a handwriting does not disappear in time in a stylus removing process of a stylus according to an embodiment of this application.

A description is provided by using an instance. In this case, still refer to FIG. 1D, which is a schematic diagram of a scenario in which a handwriting does not disappear in time in a stylus removing process of a stylus according to an embodiment of this application. Assuming that the user uses the stylus to write some content on the screen of the terminal device before a moment t1, and takes the stylus away from the screen at the moment t1. In this case, refer to (a) in FIG. 1D, which includes handwriting content displayed on the screen when the stylus just moves away from the screen and a state of the stylus at the moment t1. At a moment t2 (the moment t2 is a moment after the moment t1), although the stylus moves away from the screen, due to reasons such as the detection delay and the pressure parsing delay, the data such as the pressure value received by the terminal device is still data at the moment t1. In this case, at the moment t2, the terminal device still displays a handwriting corresponding to the moment t1. In this case, refer to (b) in FIG. 1D, which includes handwriting content displayed on the screen at the moment t2. In this case, it can be seen that at the moment t2, the handwriting hooks back on the screen after the stylus moves away.

The handwriting of the stylus does not disappear in time, and as a result, write experience of the use is poor, and use experience of the stylus and the terminal device is reduced. Therefore, how to resolve or alleviate the situation that the handwriting of the stylus does not disappear in time is a problem that needs to be resolved during actual application.

To alleviate the problem that the handwriting of the stylus does not disappear in time, an optional solution is to resolve or alleviate one or more delays of the detection delay, the pressure parsing delay, the transmission delay, and the display delay. For example, a pressure sensor with higher sampling sensibility may be used, to reduce the detection delay. A sampling frequency of the stylus on the pressure data may be improved, for example, improved from 60 Hz to 120 Hz, to reduce the pressure parsing delay. A more stable and efficient communication manner may be used between the terminal device and the stylus, to reduce the transmission delay. The terminal device may use a processor with a stronger processing capability, to shorten the display delay. Although the methods may shorten an entire delay to some extent, to alleviate the problem that the handwriting of the stylus does not disappear in time, the methods all highly depends on hardware. As a result, high costs and large difficulty are required to implement the methods. In addition, an alleviation degree is limited, and the problem that the handwriting of the stylus does not disappear in time is still serious.

To alleviate the problem that the handwriting of the stylus does not disappear in time, in this embodiment of this application, the terminal device may monitor an obtained pressure value of the stylus within a recent period of time and a signal quantity of the coupling signal; identify, based on the pressure value and the signal quantity, whether the stylus moves away from the handwriting module of the terminal device; and stop, after the terminal device determines that the stylus moves away from the handwriting module, displaying handwriting content within a subsequent preset range.

In a stylus removing process of the user, the force applied to the stylus is gradually decreased (that is, the force is released), so that a magnitude of the pressure value within the recent period of time may be considered as a feature of stylus removing. In addition, during actual application, the signal quantity of the coupling signal decreases as a distance between the stylus and the handwriting module increases, and a larger distance between the stylus tip of the stylus and the handwriting module indicates a smaller signal quantity that may be obtained by the terminal device. Therefore, a critical threshold used for evaluating the distance between the stylus tip of the stylus and the handwriting module may be set based on an actual requirement. Then, whether the stylus moves away from the handwriting module may be identified based on the obtained pressure value and the obtained signal quantity, and when identifying that the stylus moves away from the handwriting module, the terminal device chooses not to display the handwriting content within the subsequent preset range. Therefore, the handwriting may disappear in time at the first time when the stylus moves away from the handwriting module, to alleviate or even avoid the situation that the handwriting of the stylus does not disappear in time.

The following describes a scenario to which this application is applicable:

The embodiments of this application is applicable to any scenario that a stylus writes on a terminal device. The write includes but not limited to operations such as write and draw.

In addition, in the embodiments of this application, specific device types and software and hardware configurations of the terminal device and the stylus are not limited and may all be determined based on an actual application. For example, the handwriting processing method provided in the embodiments of this application may be applied to any terminal device that supports a stylus such as a mobile phone, a tablet computer, a writing pad, a drawing board, and a wearable device, and in this case, the terminal device is an execution entity of the handwriting processing method provided in the embodiments of this application. In addition, the stylus may be a resistive stylus, an inductive stylus, or a stylus using another principle. In addition, a communication manner between the stylus and the terminal device is also not limited in the embodiments of this application, and any communication manner may be used.

To describe the technical solutions in this application, the following is described by using an example in which the handwriting module is a screen of the terminal device and the stylus is an inductive stylus with reference to specific embodiments. In other embodiments, the handwriting module may alternatively be hardware other than the screen. In a process that the user uses the stylus to write, the force applied by the user to the stylus may be transmitted from the stylus to the handwriting module of the terminal device. Therefore, the pressure value in the embodiments of this application may be a pressure value corresponding to the force applied by the user to the stylus, or may be a pressure value corresponding to the force applied by the stylus to the handwriting module of the terminal device, and the force corresponding to the two pressure values are essentially the same. The following is described by using an example in which the pressure value is the pressure value corresponding to the force applied by the user to the stylus.

Figure 2:
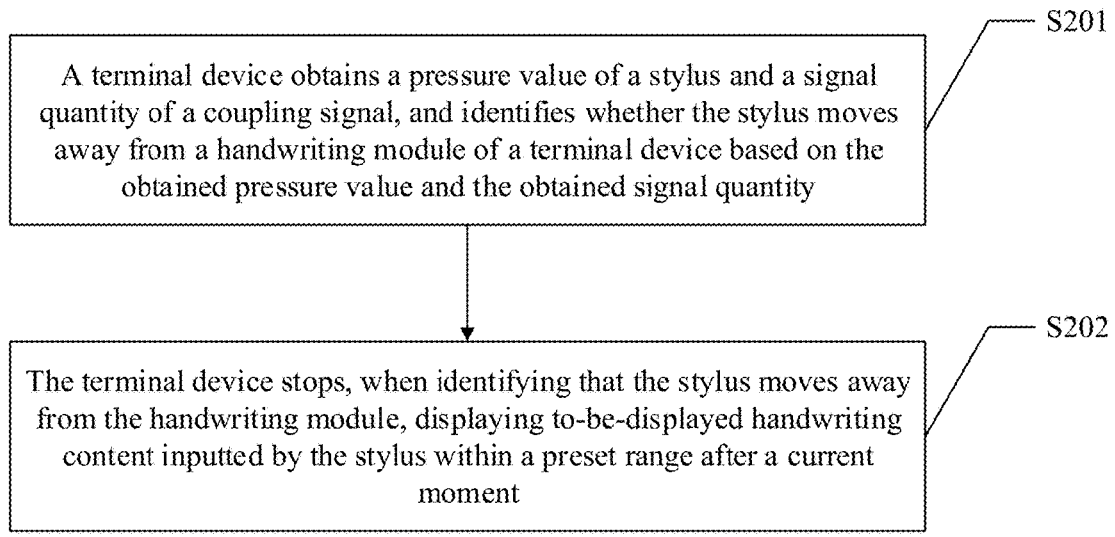
FIG. 2 is an implementation flowchart of a handwriting processing method according to an embodiment of this application.

FIG. 2 is an implementation flowchart of a handwriting processing method according to an embodiment of this application, and details are as follows:

S201. A terminal device obtains a pressure value of a stylus and a signal quantity of a coupling signal, and identifies whether the stylus moves away from a handwriting module of a terminal device based on the obtained pressure value and the obtained signal quantity. The pressure value obtained in S201 may also be referred to as a first pressure value, and the obtained signal quantity may also be referred to as a first signal quantity or a first signal strength.

During actual application, the stylus implements writing by perform an operation on a screen through a stylus tip portion, so that in the embodiments of this application, whether the stylus moves away from the screen actually refers to whether the stylus tip of the stylus moves away from the screen.

On one hand, the pressure value of the stylus (hereinafter referred to as a pressure value) may change as force applied by a user to the stylus changes. Within a valid range that the pressure value may be detected, when the force applied by the user to the stylus increases, the pressure value may increase correspondingly, and when the force applied by the user to the stylus decreases, the pressure value may decrease correspondingly. In a stylus removing process, the force applied by the user to the stylus may gradually decrease, so that the pressure value gradually decreases in the stylus removing process. Therefore, theoretically, by detecting the change trend of the pressure value, a stylus removing action of the user may be identified.

It should be noted that, for a stylus of another principle type such as a resistive stylus, a method for obtaining the pressure value may be different. For example, in some scenarios, the terminal device may actively detect the pressure value. However, in the valid range that the pressure value may be detected, the pressure value may also change as the force applied by the user to the stylus changes, so that the stylus removing action may also be identified by using the change trend of the pressure value.

On the other hand, during actual application, the signal quantity of the coupling signal decreases as a distance between the stylus and the screen increases, and a larger distance between the stylus tip of the stylus (hereinafter referred to as a stylus tip) and the screen indicates a smaller signal quantity that may be obtained by the terminal device. A description is provided by using an instance, refer to FIG. 3, which is a schematic diagram of a scenario of a signal quantity of a coupling signal, applied force, and a distance to a screen according to an embodiment of this application. Assuming that a signal quantity when the stylus tip of the stylus is just in contact with the screen is 6200, when the user continues to apply force to the stylus, the signal quantity may be increased to 6800, and when the distance between the stylus tip and the screen is 0.2 mm, the signal quantity may be decreased to 5800. Therefore, theoretically, the distance between the stylus tip and the screen may be identified based on a magnitude of the signal quantity.

Based on the foregoing analysis, in this embodiment of this application, the stylus removing action of the user may be identified by using the pressure value, and the distance between the stylus and the screen may be identified with reference to the signal quantity, to accurately identify whether the stylus tip moves away from the screen in the stylus removing process. Specifically, it may be identified whether the pressure value is in a decreasing change trend in a recent period of time, and it may be identified whether the signal quantity is less than a set critical threshold simultaneously. If the two conditions are met simultaneously, it may be determined that the stylus moves away from the handwriting module.

Obtaining manners of the pressure value and the signal quantity are not limited herein, and may be determined based on an actual application situation. For example, the pressure value and the signal quantity are both detected by the stylus and sent to the terminal device for use, or the terminal device actively detects one or two pieces of data therein. In addition, obtaining frequencies (that is, an execution frequency of S201) of the pressure value and the signal quantity are also not limited herein. For example, in some optional embodiments, some trigger conditions may be set, for example, the pressure value is not 0, and the operation of S201 is performed when the trigger condition is met.

Figure 4:
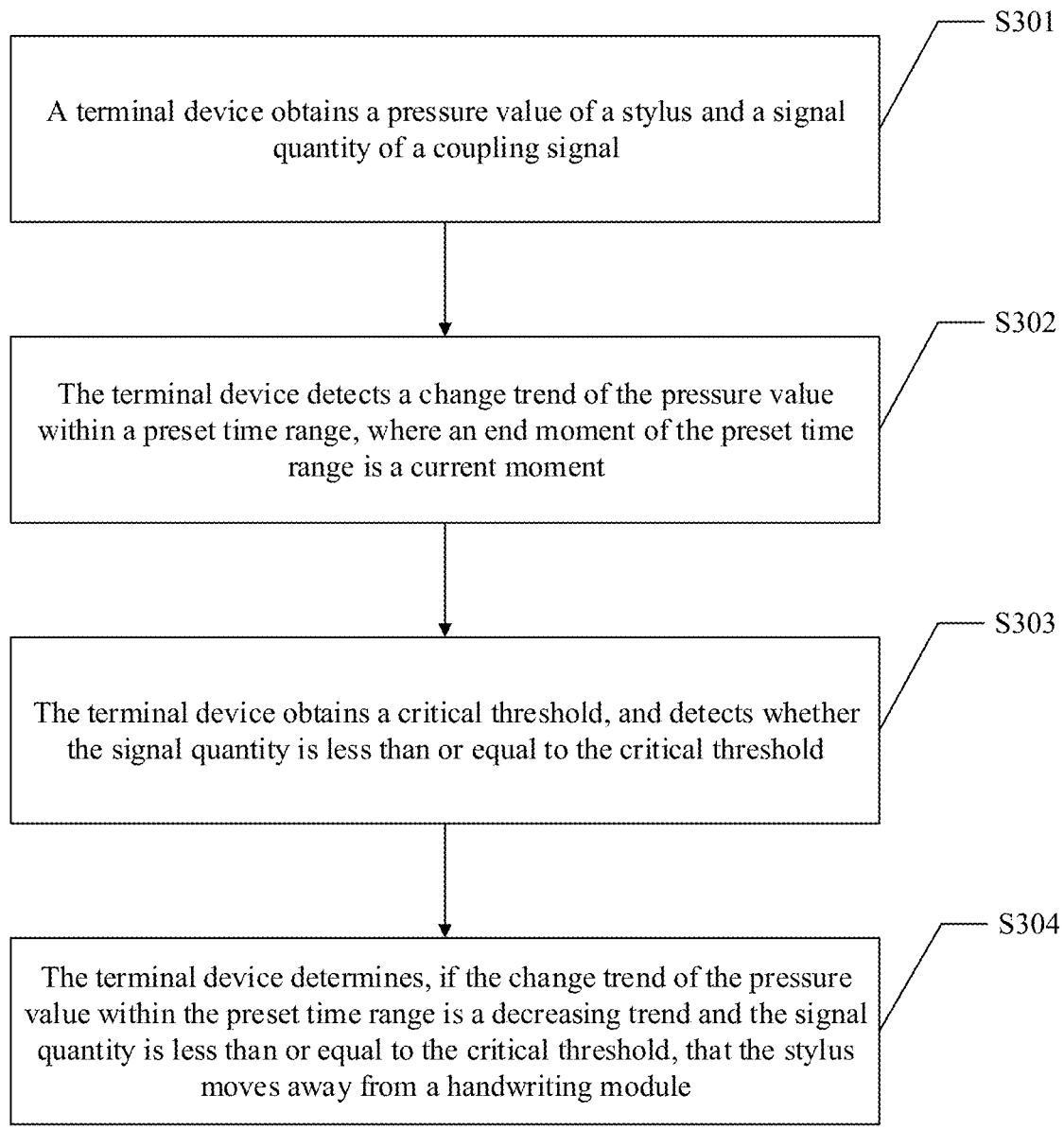
FIG. 4 is a schematic flowchart of implementing a method for identifying whether a stylus moves away from a first module according to an embodiment of this application.

In an optional embodiment of this application, refer to FIG. 4, which is a schematic flowchart of implementing a method for identifying whether a stylus moves away from a handwriting module of a terminal device according to an embodiment of this application. In this case, S201 may be replaced with S301 to S304. Detailed descriptions are as follows:

S301. The terminal device obtains a pressure value of the stylus and a signal quantity of a coupling signal.

S302. The terminal device detects a change trend of the pressure value within a preset time range, where an end moment of the preset time range is a current moment.

For the operation of S301, refer to the related description of S201, and details are not described herein again. In this embodiment of this application, the change trend of the pressure value needs to be detected, so that pressure value data within the preset time range is obtained, and a specific quantity of obtained pressure values needs to be determined based on a sampling frequency of the stylus or the terminal device on the pressure value and a time length of the preset time range. The signal quantity may be a signal quantity that is obtained most recently.

In this embodiment of this application, a time range (that is, the preset time range) for detecting the pressure value may be preset by a technician, which is not limited herein. To cause a result of change trend analysis to have real-time performance, the preset time range actually is a period of time that is closest to the current moment, so that the end moment of the preset time range is the current moment.

In some optional embodiments, considering that time actually consumed by a stylus removing action of a user is generally at a millisecond level, a time length upper limit of the preset time range may be set to 1000 milliseconds. Specifically, average time consumed by stylus removing actions of some users may be counted in advance, and the average time consumed is used as the upper limit. By appropriately setting the upper limit of the preset time range, the time length of the preset time range may be prevented from being excessively long. As a result, a case that the stylus removing action cannot be accurately detected due to a decrease in the validity of the collected pressure value caused by excessively high action complexity of the user within the time range may be prevented.

In addition, considering that a detection frequency of the terminal device or the stylus on the pressure value is limited, for example, common detection frequencies include 60 Hz, 120 Hz, and 144 Hz, the detection frequency on the pressure value decides a shortest interval required for obtaining a single pressure value. For example, for the detection frequency of 60 Hz, the terminal device may obtain one pressure value every 16.66 milliseconds as quickly as possible. When change trend analysis is performed, a certain quantity of pressure values are required, so that the change trend obtained through analysis has certain reliability. Based on this, in this embodiment of this application, a smallest sample quantity may be preset, and a time length lower limit of the preset time range is calculated based on a quotient of the detection frequency of the terminal device or the stylus on the pressure value and the smallest sample quantity. For example, assuming that the detection frequency is 60 Hz, and the set smallest sample quantity is 10, in this case, the time length lower limit of the preset time range is equal to 10 divided by 60 Hz, that is, 166.6 milliseconds.

In an optional embodiment of this application, in a case that the time length upper limit and the time length lower limit of the preset time range are met, any value within a range from the lower limit to the upper limit may be selected as the time length of the preset time range. For example, assuming that the lower limit is 166.6 milliseconds and the upper limit is 1000 milliseconds, in this case, any value within a range from 166.6 milliseconds to 1000 milliseconds may be selected as the time length of the preset time range. For example, 500 milliseconds may be set, and in this case, the preset time range is 500 milliseconds that is closest to the current moment. In a case that a specific time length of the preset time range is known, a start moment may be determined by calculating the specific time length forward based on the current moment, to determine the preset time range from the start moment to the current moment.

In some embodiments, S301 may also be replaced with: The terminal device detects a change trend of a pressure value in a preset time length that is closest to a current moment. The preset time length is the time length of the preset time range. This only describes the preset time range in another manner, and the essential principle is still consistent. Details are not described herein again.

After obtaining the pressure value within the preset time range, the terminal device may start to analyze the change trend of the pressure value within the preset time range, for example, a decreasing trend, an increasing trend, or a stable trend. The decreasing trend may also be referred to as a descending trend, gradually decreasing, or changing from large to small, which means that the pressure value is entirely in a decreasing trend within the preset time range. The increasing trend may also be referred to as an ascending trend, gradually increasing, or changing from small to large, which means that the pressure value is entirely in an increasing trend within the preset time range. A specific method for analyzing the change trend is not limited in this embodiment of this application, and any method that may analyze the change trend of the data may be used. For example, in some optional embodiments, the change trend of the pressure value may be analyzed by using a neural network learning method. Alternatively, function fitting may be performed on obtained pressure values by using a curve fitting method, and a corresponding change trend may be determined based on a fitted function (that is, a pressure change function). For example, assuming that the fitted function is an increasing function, it indicates that the change trend is an increasing trend, and if the fitted function is a decreasing function, it indicates that the change trend is a decreasing trend.

Figure 5:
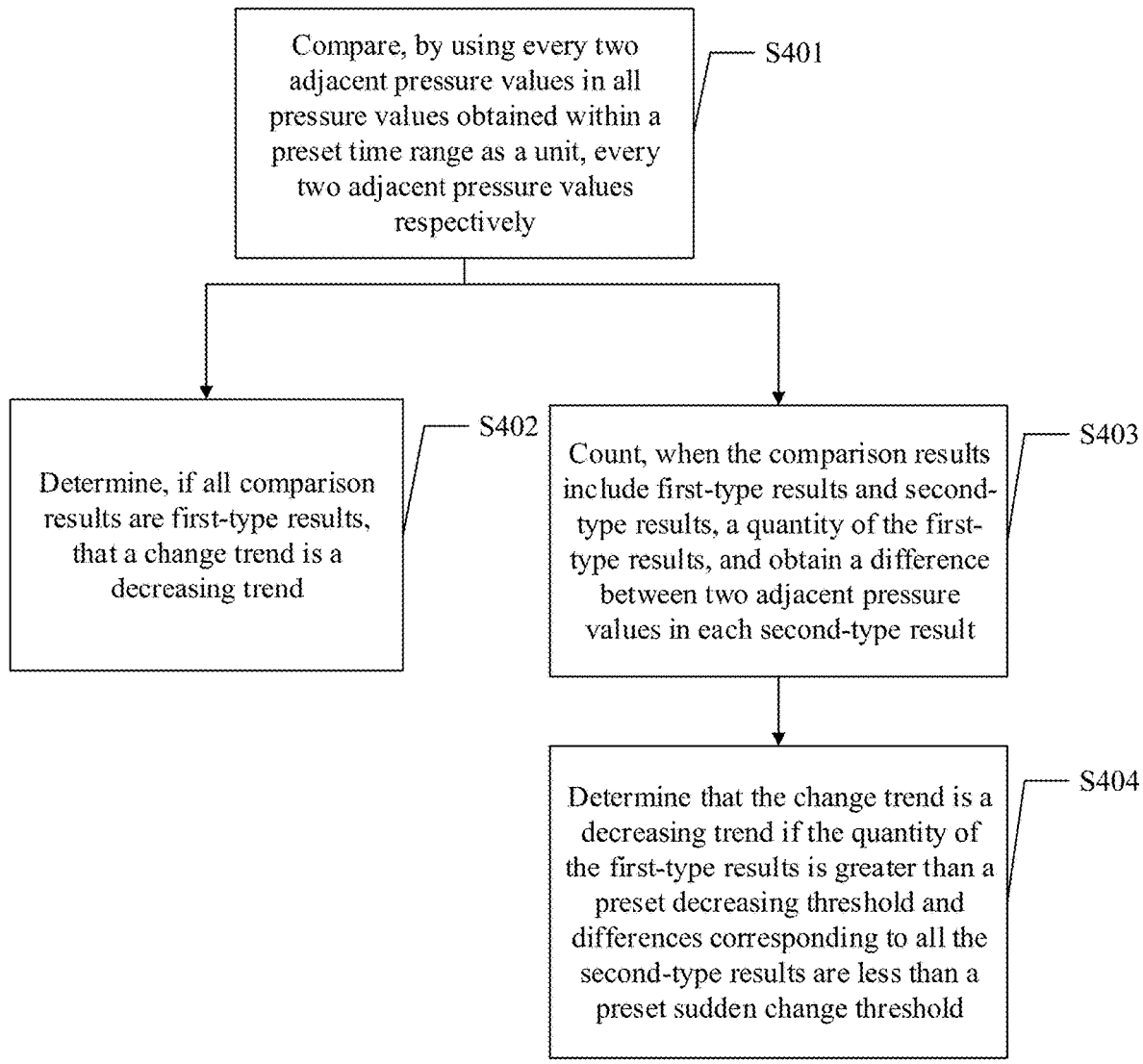
FIG. 5 is a schematic flowchart of performing change trend analysis on a pressure value according to an embodiment of this application.

In an optional embodiment of this application, refer to FIG. 5, which is a schematic flowchart of performing change trend analysis on a pressure value according to an embodiment of this application. In this case, S302 may be replaced with S401 to S404. Detailed descriptions are as follows:

S401. Compare, by using every two adjacent pressure values in all pressure values obtained within the preset time range as a unit, every two adjacent pressure values respectively.

In a stylus removing process of the user, the force applied to the stylus is gradually decreased, and therefore obtained pressure values are theoretically decreasing. Based on this, in this embodiment of this application, related and adjacent pressure values may be first compared, to determine whether each adjacent pressure value is increased or decreased. In this case, a comparison result of every two adjacent pressure values may be classified into two possible results: a first-type result and a second-type result. The first-type result refers to that a pressure value obtained first is greater than a pressure value obtained later, that is, the pressure value is decreased. The second-type result refers to that a pressure value obtained first is less than or equal to a pressure value obtained later, that is, the pressure value remains unchanged or is increased.

A description is provided by using an instance, assuming that within the preset time range, according to a sequence of obtained time, 5 pressure values are obtained, which are respectively: a pressure value 1, a pressure value 2, a pressure value 3, a pressure value 4, and a pressure value 5. In this case, by comparing every two adjacent pressure values, 4 groups of comparison results may be obtained, which are respectively: a comparison result 1 of the pressure value 1 and the pressure value 2, a comparison result 2 of the pressure value 2 and the pressure value 3, a comparison result 3 of the pressure value 3 and the pressure value 4, and a comparison result 4 of the pressure value 4 and the pressure value 5. Based on this, assuming that a magnitude relationship of the 5 pressure values is: the pressure value 1 is greater than the pressure value 2, the pressure value 2 is greater than the pressure value 3, the pressure value 3 is less than the pressure value 4, and the pressure value 4 is greater than the pressure value 5. In this case, it may be learned that, the comparison result 1, the comparison result 2, and the comparison 4 belong to the first-type result, and since the pressure value 3 is less than the pressure value 4, the comparison result 3 belongs to the second-type result.

S402. Determine, if all comparison results are first-type results, that the change trend is a decreasing trend. The first-type result refers to that a pressure value obtained first is greater than a pressure value obtained later in two adjacent pressure values.

When all the comparison results are the first-type results, it indicates that the pressure value is continuously decreased, and the user is moving away the stylus. In this case, it may be determined that the change trend is a decreasing trend.

In an optional embodiment of this application, if all the comparison results are the second-type results, it indicates that the user is remaining the force applied to the stylus or increasing the force applied. In this case, the change trend may be an increasing trend or a stable trend.

S403. Count, when the comparison results include first-type results and second-type results, a quantity of the first-type results, and obtain a difference between two adjacent pressure values in each second-type result. The second-type result refers to that a pressure value obtained first is less than or equal to a pressure value obtained later in two adjacent pressure values.

S404. Determine that the change trend is a decreasing trend if the quantity of the first-type results is greater than a preset decreasing threshold and differences corresponding to all the second-type results are less than a preset sudden change threshold.

Considering that during actual application, due to influence of various known or unknown factors, changes of the pressure value may be hardly in a standard decreasing trend. For example, in a process that the pressure value is decreased, since the force applied by the user to the stylus is non-uniform, the pressure value may be increased suddenly or remain unchanged. Therefore, to improve the accuracy in identifying a decreasing trend, in this embodiment of this application, when the first-type results and the second-type results are detected simultaneously, the quantity of the first-type results is counted, and the difference between every two adjacent pressure values in each second-type result is also calculated. For example, assuming that the pressure value 3 is less than the pressure value 4, the comparison result 3 of the pressure value 3 and the pressure value 4 belongs to the second-type result. In this case, a difference by subtracting the pressure value 3 from the pressure value 4 may be calculated in this embodiment of this application.

Based on that a difference corresponding to each second-type result is obtained, whether a difference is excessively great may continue to be detected in this embodiment of this application. Specifically, whether a difference is greater than or equal to the preset sudden change threshold may be detected. If an excessively great difference exists, it probably indicates that the user does not perform a normal stylus removing operation. When all the differences are less than the sudden change threshold, it indicates that although the pressure value is suddenly increased but an increasing degree is limited, which may be noise data generated by some factors. Therefore, in this embodiment of this application, when it is detected that a large quantity of pressure values are decreased (that is, the quantity of the first-type results is less than the preset decreasing threshold), and all the differences are less than the sudden change threshold, it may still be determined that the change trend is a decreasing trend. Specific values of the decreasing threshold and the sudden change threshold are not limited herein, and may be autonomously set by a technician. For example, in some optional embodiments, the decreasing threshold may be set to a preset ratio such as 2/3 of a quantity of all pressure values obtained within the preset time range, or the decreasing threshold may be set to a specific value such as 20 or 25.

According to this embodiment of this application, on one hand, whether the pressure value is in a decreasing trend may be normally identified, and on the other hand, interference from some noise data may also be tolerated. In addition, the change trend may still be accurately identified as a decreasing trend when the noise appears, therefore, a strong anti-interference capability is provided.

S303. The terminal device obtains a critical threshold, and detects whether the signal quantity is less than or equal to the critical threshold.

Figure 3:
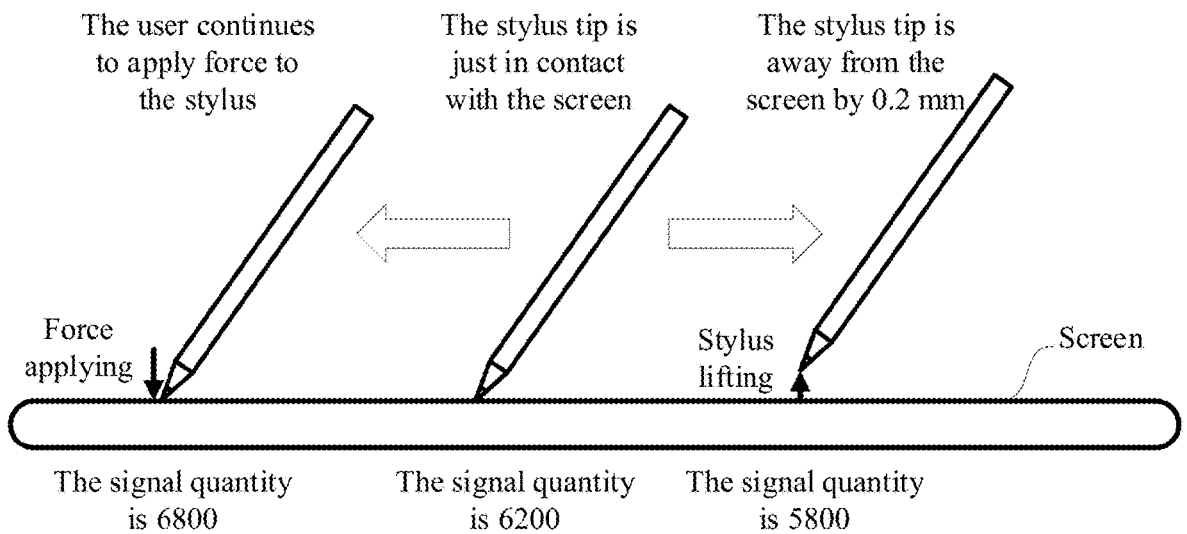
FIG. 3 is a schematic diagram of a scenario of a signal quantity, applied force, and a distance to a screen according to an embodiment of this application.

As can be learned from the related descriptions of the embodiment shown in FIG. 3, the signal quantity of the coupling signal may decrease as the distance between the stylus and the screen increases. In addition, it is found during actual application that, even if the stylus is in a state of being just separated from the screen, a certain signal quantity may also exist. Therefore, in this embodiment of this application, a corresponding critical threshold may also be set for a state that the stylus is just separated from the screen, and after the signal quantity is obtained, whether the signal quantity is less than or equal to the critical threshold may be compared. In this embodiment of this application, a critical threshold that needs to be used or a critical threshold that needs to be learned by the terminal device currently may be referred to as a target critical threshold. For example, the target critical threshold is obtained in S303.

In this embodiment of this application, a method for setting the critical threshold is not limited, and the method includes but not limited to presetting a fixed critical threshold, or presetting a critical threshold learning method for the terminal device to autonomously determine a suitable critical threshold through learning.

In an optional embodiment of this application, considering that during actual application, hardware situations at different positions of the screen may be different, during actual application, when the stylus is in a state of being just separated from the different positions of the screen, signal quantities detected by the terminal device may also be different. Based on this, to improve the accuracy in detecting the distance between the stylus and the screen, that is, to improve the accuracy in detecting moving away of the stylus from the screen, in this embodiment of this application, the screen may be divided into a plurality of different regions in advance, and each region is used as an independent critical threshold setting object. Based on this, an operation of obtaining the critical threshold in S303 may specifically include: S3031. The terminal device obtains a region in which the stylus is located, and obtains a critical threshold associated with the region.

Specifically, the terminal device may first obtain coordinate information of the stylus, position the region in which the stylus is located at the current moment based on the coordinate information, and obtain the critical threshold corresponding to the region. The region in which the stylus is located may be referred to as a current region or a first region below.

In this embodiment of this application, a division rule of the regions of the screen is not limited, and may be autonomously set by a technician. For example, in some optional embodiments, a smallest region may be refined to a pixel level, for example, each pixel in the screen may be defined as a region, and in this case, a quantity of pixels is a quantity of the regions. In another optional embodiment, the screen may alternatively be divided into several regions including a plurality of pixels and great areas.

Figure 6:
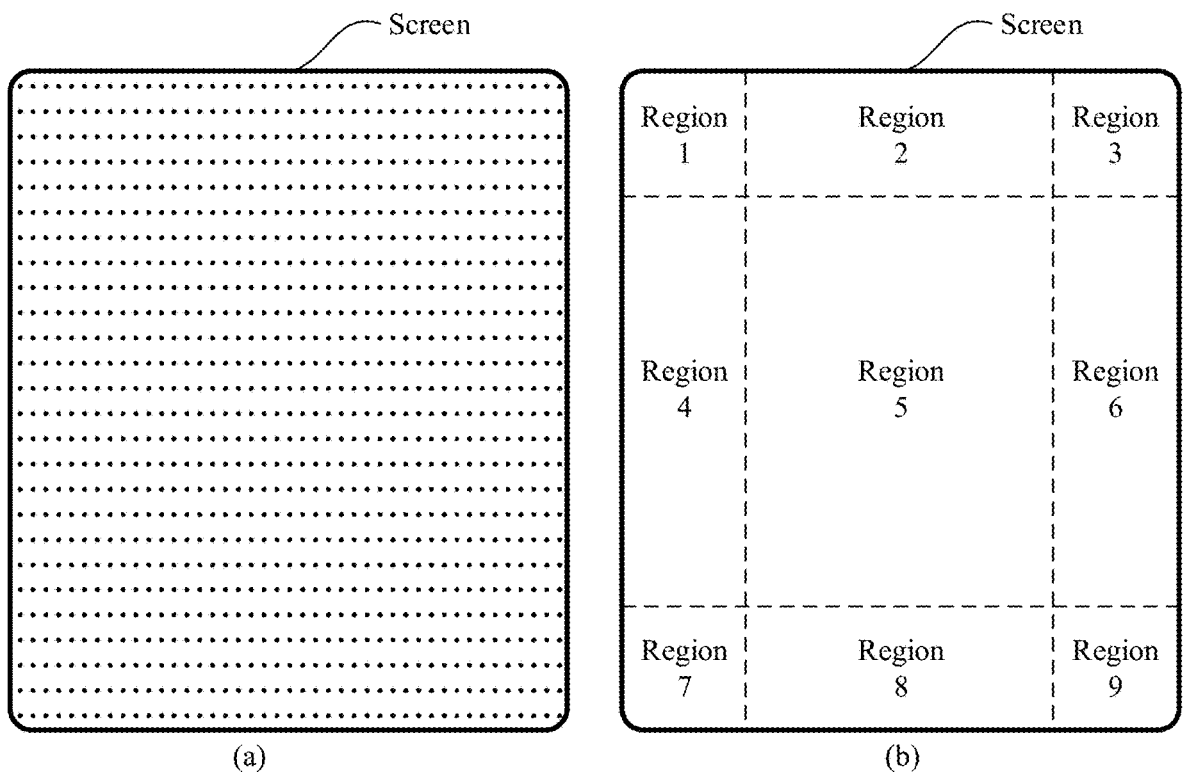
FIG. 6 is a schematic diagram of a scenario of performing region division on a screen according to an embodiment of this application.

For example, refer to FIG. 6, which is a schematic diagram of a scenario of performing region division on a screen according to an embodiment of this application. As shown in (a) in FIG. 6, each pixel in the screen may be defined as a region. In this case, the screen includes regions whose quantity is same as a quantity of the pixels. Alternatively, as shown in (b) in FIG. 6, the screen may be divided into 9 regions which are respectively a region 1 to a region 9 having different areas and include a plurality of pixels.

Considering that during actual application, some regions may not have an associated critical threshold. For example, a technician does not set a critical threshold with a fixed value for some regions, or although a critical threshold learning method is set, but some regions cannot obtain a corresponding critical threshold through learning due to influence of various situations. In this case, the required critical threshold may not be directly obtained in S3031. To cope with this situation, in this embodiment of this application, when the terminal device does not obtain the critical threshold associated with the region in which the stylus is located, the terminal device may perform critical threshold searching on surrounding regions, and determine a critical threshold used in this time based on found critical thresholds. Based on S3031, refer to FIG. 7, which is a schematic flowchart of a critical threshold obtaining method according to an embodiment of this application. Detailed descriptions are as follows:

S3031. The terminal device obtains a region in which the stylus is located, and obtains a critical threshold associated with the region.

In this case, the terminal device uses the critical threshold of the region in which the stylus is located, so that the critical threshold in this case may also be referred to as a target critical threshold.

S3032. If the critical threshold associated with the region in which the stylus is located is not obtained, the terminal device searches for a critical threshold of each region within a preset region range adjacent to the region.

During actual application, the similarity of hardware situations of adjacent regions in the screen is generally high. For example, wiring of adjacent regions in the screen is close, and therefore, closer regions indicate that hardware configuration situations and interference situations by the outside are more consistent. For example, when the screen is affected by the outside such as being impacted, affected situations of adjacent regions are generally similar. Therefore, when the critical threshold of the region in which the stylus is located is not directly obtained, in this embodiment of this application, critical threshold searching may be first performed on surrounding regions of the stylus. A specific searching preset region range is not limited herein. For example, in some optional embodiments, the preset region range may be set to n regions that is closest to the region in which the stylus is located, where n is any positive integer, or the preset region range may be set to a range using the region in which the stylus is located as a center of a circle with a radius of m, where m is any positive number. In some other optional embodiments, the region may alternatively be divided into a plurality of channels in rows or columns. In this case, each channel includes a plurality of regions in a row or a column. Based on this, the preset region range may alternatively be one or a plurality of closest channels.

A description is provided by using an instance, and still refer to the embodiment shown in FIG. 6. Assuming that the preset region range is set to 5 regions that are closest to the region in which the stylus is located, the region in which the stylus is located is a region 7 in (b) in FIG. 6. In this case, the preset region range includes 5 regions, which are a region 4, a region 8, a region 1, a region 5, and a region 9. Therefore, when a critical threshold associated with a region 7 is not obtained, critical threshold searching may be performed on the 5 regions.

S3033. Determine the critical threshold corresponding to the region in which the stylus is located based on one or more found critical thresholds.

When one or more critical thresholds are found within the preset region range, the terminal device may determine, by using the critical thresholds as a reference standard, a signal region that may be applied to the region in which the stylus is located. For example, a mean value or a mode value of the critical thresholds may be used as the signal region that may be applied to the region in which the stylus is located, or a critical threshold of a region that is in the critical thresholds and that is closest to the region in which the stylus is located may be used as the signal region that may be applied to the region in which the stylus is located.

In an optional embodiment of determining the critical threshold in S3033 in this application, in this embodiment of this application, the critical threshold corresponding to the region in which the stylus is located may be specifically determined based on the found critical thresholds. In this case, S3033 may be replaced with S30331 and S30332. Detailed descriptions are as follows:

S30331. If only one critical threshold is found, the found critical threshold is used as the critical threshold corresponding to the region in which the stylus is located.

S30332. If critical thresholds of a plurality of regions are found, a region that is closest to the region in which the stylus is located is screened out from the plurality of found regions; if one closest region is screened out, a critical threshold of the closest region is used as the critical threshold corresponding to the region in which the stylus is located; and if there are a plurality of regions that are closest to the region in which the stylus is located in a plurality of regions that are screened out, a mean value of critical thresholds of the regions is used as a region that is closest to the region in which the stylus is located.

The region that is screened out in S30332 and that is closest to the region in which the stylus is located may also be referred to as a second region.

In a case that only one region with a critical threshold is found within the preset region range, the critical threshold of the region may be used as the critical threshold used by the region in which the stylus is located. In a case that a plurality of regions with critical thresholds are found within the preset region range, a region that is physically closest to the region in which the stylus is located may be first screened out based on the principle of proximity. If only one closest region is found, a critical threshold of the region may be used as the critical threshold used by the region in which the stylus is located. If a plurality of closest regions with a same physical distance are found, a mean value of critical thresholds of the regions may be obtained, and the mean value is used as the critical threshold used by the region in which the stylus is located.

A description may still be provided by using the embodiment shown in FIG. 6 as an example. Assuming that the preset region range is set to 5 regions that are closest to the region in which the stylus is located, the region in which the stylus is located is a region 7 in (b) in FIG. 6. In this case, the preset region range includes 5 regions, which are a region 4, a region 8, a region 1, a region 5, and a region 9. Assuming that only a critical threshold of one region is found after searching is performed on the 5 regions, the found critical threshold may be used by the region 7 in this case. If a plurality of critical thresholds are found, a quantity of closest regions continues to be identified. For example, assuming that critical thresholds of the region 4, the region 5, and the region 9 are found, only the region 4 is closest to the region 7 in this case, so that the critical threshold of the region 4 may be used by the region 7. Assuming that critical thresholds of the region 4, the region 8, and the region 5 are found, the region 4 and the region 8 are closest to the region 7 in this case, so that a mean value of the critical thresholds of the region 4 and the region 8 may be used as the critical threshold of the region 7.

In this embodiment of this application, when the critical threshold of the region in which the stylus is not directly obtained, critical threshold searching is actively performed on surrounding regions, and a most suitable critical threshold is adaptively determined based on searching results. Therefore, this embodiment of this application effectively copes with various possible situations of the critical threshold, which has strong adaptability and compatibility to the various possible situations, and the validity of the obtained critical threshold may be improved.

In an optional embodiment of this application, when the terminal device cannot obtain an available critical threshold, and a relationship between the signal quantity and the critical threshold cannot be detected in S303, in this embodiment of this application, an identification result may be selected as: whether the stylus moves away from the handwriting module of the terminal device cannot be identified. In this case, the terminal device may continue to normally display the handwriting.

S304. The terminal device determines, if the change trend of the pressure value within the preset time range is a decreasing trend and the signal quantity is less than or equal to the critical threshold, that the stylus moves away from the handwriting module.

When identifying that the pressure value is in a decreasing trend (that is, changing from large to small) and the signal quantity is less than or equal to the critical threshold, it indicates that the stylus is in a state of being removed and the distance to the screen has reached a state of being just separated. Therefore, in this embodiment of this application, it may be determined that the stylus moves away from the screen in this case.

S202. The terminal device stops, when identifying that the stylus moves away from the handwriting module, displaying to-be-displayed handwriting content inputted by the stylus within a preset range after a current moment.

When identifying that the stylus moves away from the screen, to avoid that the handwriting does not disappear in time, in this embodiment of this application, display of the handwriting may be canceled after the stylus moves away. Specifically, in this embodiment of this application, a preset range that is not displayed each time may be preset, and every time when identifying that the stylus moves away from the screen, all handwriting content within the preset range is not displayed. Handwriting content after the current moment is actually not displayed, so that the handwriting content may all be considered as handwriting content waiting to be displayed subsequently, that is, the to-be-displayed handwriting content in this embodiment of this application. In normal cases, if the to-be-displayed handwriting content needs to be displayed, a new coupling signal need to be obtained and response processing needs to be performed to obtain corresponding handwriting content, and then the handwriting content is displayed on the screen. Therefore, to not display the to-be-displayed handwriting content, the terminal device may choose to stop responding to the new coupling signal obtained after the current moment, so as to stop generating the to-be-displayed handwriting content.

The preset range may also be referred to as a first preset range. A specific range of the preset range is not limited in this embodiment of this application. In addition, in some embodiments, the preset range may be a time range, and in this case, the preset range may also be referred to as a first time range. For example, the first time range may be set to within h milliseconds, where h is any positive number within 1000. For example, h may be set to 30, and in this case, the terminal device may not display to-be-displayed handwriting content within future 30 milliseconds. Alternatively, the first time range may be set to infinite. In this case, the terminal device may stop displaying the to-be-displayed handwriting content infinitely until the terminal device is triggered by another trigger condition to start to display the handwriting content. In some other optional embodiment, the preset range may alternatively be a quantity range of a coupling signal. For example, the terminal device may stop responding to k coupling signals obtained after the current moment, to not display handwriting content corresponding to the coupling signals, where k is any positive integer. For example, if k is 1, the terminal device does not display handwriting content of a next frame. The coupling signal obtained after the current moment may be referred to as a target coupling signal.

In an optional embodiment of this application, handwriting content corresponding to the current moment may be displayed or may not be displayed.

It should be noted that, in this embodiment of this application, all generated handwriting content and to-be-displayed handwriting content are considered as handwriting content inputted by the stylus.

In an optional embodiment of this application, if it is not identified that the stylus moves away from the handwriting module, the terminal device may choose to normally display the handwriting.

It should be understood that, during actual application, a trigger condition of S201 may be set based on a requirement. In this case, a quantity of operation execution times of S201 and S202 may be single or plural, which may be specifically determined based on an actual situation. This is not limited herein.

Figure 8:
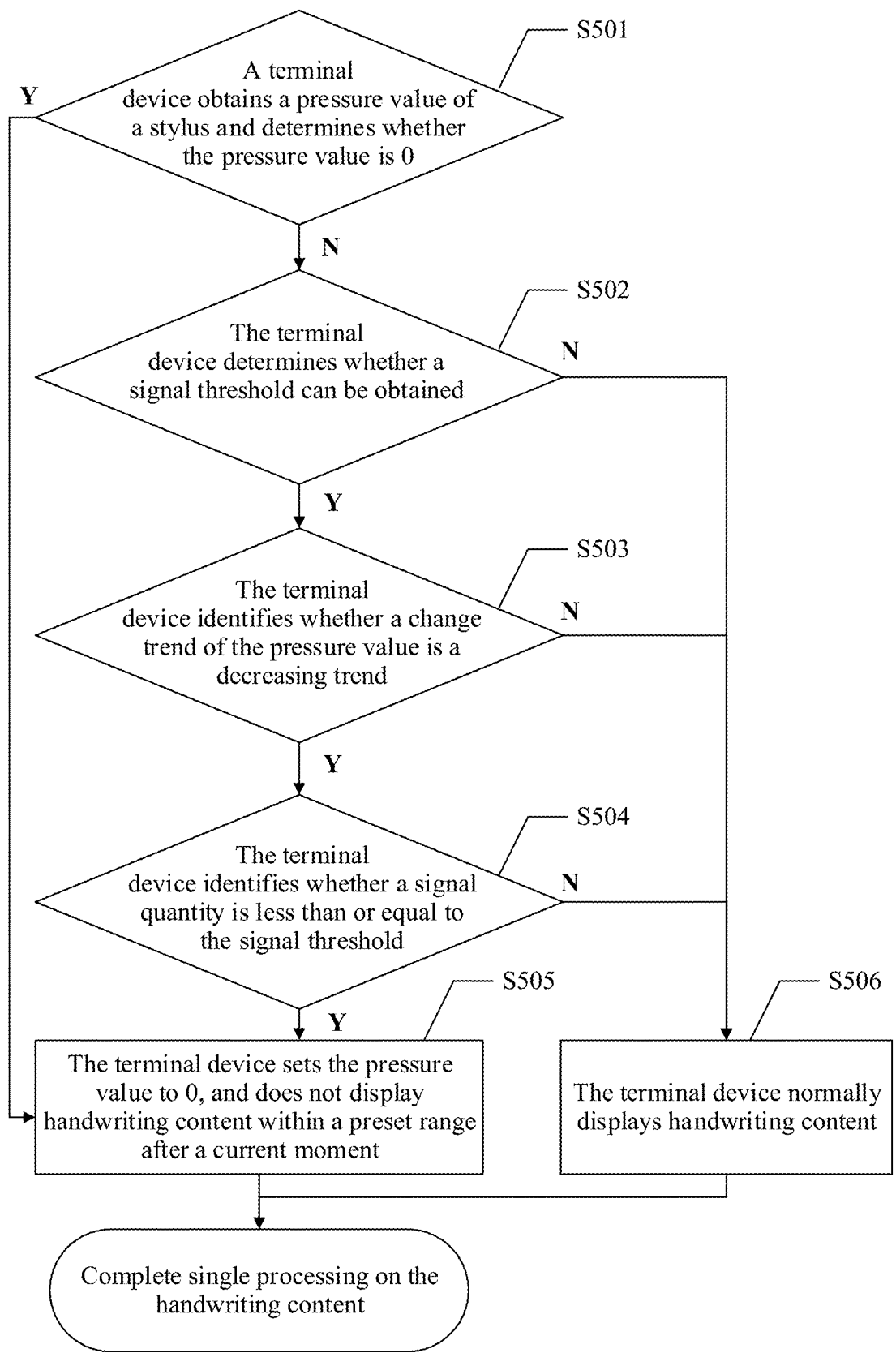
FIG. 8 is a schematic flowchart of an overall solution of a handwriting processing method according to an embodiment of this application.

In an optional embodiment of this application, refer to FIG. 8, which is a schematic flowchart of an overall solution of a handwriting processing method according to an embodiment of this application. Detailed descriptions are as follows:

S501. A terminal device obtains a pressure value of a stylus and determines whether the pressure value is 0. If the pressure value is not 0, S502 is performed. If the pressure value is 0, an operation of S505 is performed.

S502. The terminal device obtains a critical threshold associated with a region in which the stylus is located, and determines whether the critical threshold can be obtained. If the critical threshold can be obtained, S503 is performed; and if the critical threshold cannot be obtained, S506 is performed.

S503. The terminal device identifies whether a change trend of the pressure value within a preset time range is a decreasing trend. If the change trend is a decreasing trend, S504 is performed; and if the change trend is not a decreasing trend, S506 is performed.

S504. The terminal device identifies whether a signal quantity of a coupling signal is less than or equal to a critical threshold. If the signal quantity is less than or equal to the critical threshold, S505 is performed; and if the signal quantity is greater than the critical threshold, S506 is performed.

S505. The terminal device sets the pressure value to 0, and does not display handwriting content within a preset range after a current moment.

S506. The terminal device normally displays handwriting content.

After the operation of S505 or S506 is performed, single processing on the handwriting content is completed.

For operation details, principles, and beneficial effects of S502 to S506, refer to the related descriptions of the embodiments of FIG. 2 to FIG. 7, and details are not described herein again. In addition, a processing solution when the pressure value is 0 is further added to this embodiment of this application. When the pressure value is 0, it indicates that the stylus has moved away from a screen, so that the terminal device may jump to the operation of not displaying handwriting content in S505 in this case.

In an optional embodiment of this application, the operations of S501 to S506 may be performed once every time the terminal device obtains a new pressure value or coupling signal, or may be periodically performed based on a preset processing frequency, which is not limited herein.

The embodiments shown in FIG. 1A to FIG. 8 are all embodiments for processing a handwriting of a stylus. In an optional embodiment of this application, it may be set that when the terminal device is in a stylus mode, the terminal device executes content of the foregoing embodiments. The stylus mode may be manually enabled by the user, or may be actively enabled when the terminal device detects the stylus or another preset condition.

To alleviate the problem that the handwriting of the stylus does not disappear in time, in this embodiment of this application, the terminal device may monitor the obtained pressure value of the stylus and the signal quantity of the coupling signal; determine, when detecting that the pressure value is in a decreasing trend and the signal quantity is less than or equal to the critical threshold, that the stylus moves away from the handwriting module; and stop, after the terminal device determines that the stylus moves away from the handwriting module, displaying handwriting content within a subsequent preset range.

In the stylus removing process of the user, the force applied to the stylus is gradually decreased (that is, the force is released), so that a descending trend of the pressure value may be considered as a feature of stylus removing. In addition, during actual application, the signal quantity of the coupling signal decreases as a distance between the stylus and the handwriting module increases, and a larger distance between a stylus tip of the stylus and the handwriting module indicates a smaller signal quantity that may be obtained by the terminal device. Therefore, a critical threshold used for evaluating the distance between the stylus tip of the stylus and the handwriting module may be set based on an actual requirement. In a process that the pressure value decreases, the signal quantity is reduced to be less than or equal to the critical threshold, this indicates that the stylus removing operation has reached a state that the stylus tip moves away from the handwriting module. That is, in this case, the stylus has moved away from the handwriting module. In this way, separation of the stylus from the handwriting module is identified quickly and accurately. In this case, the terminal device chooses not to display the handwriting content within the subsequent preset range, so that the handwriting disappears in time at the first time when the stylus moves away from the handwriting module, thereby alleviating or avoiding the situation that the handwriting of the stylus does not disappear in time. In addition, in this embodiment of this application, a specific identification solution for the change trend of the pressure value and a specific obtaining solution of the critical threshold are further provided, so that the change trend and the critical threshold can be accurately and effectively processed.

In an optional embodiment of this application, considering that during actual application, in a state that the stylus is just separated from the screen, the signal quantity of the coupling signal is at least affected by a situation of the terminal device and a situation of the stylus. Therefore, even for a same terminal device, suitable critical thresholds under different use scenarios may be greatly different. Based on this, to improve the validity of the critical threshold and enable the state that the stylus is just separated from the screen to be better identified based on the critical threshold used in the embodiments shown in FIG. 2 to FIG. 8, based on the embodiments shown in FIG. 2 to FIG. 8, refer to FIG. 9A, which is a schematic flowchart of a critical threshold learning method according to an embodiment of this application. Detailed descriptions are as follows:

S600. When a preset trigger condition is met, S601 is performed, and a terminal device starts to learn a critical threshold.

The critical threshold that the terminal device needs to learn may also be referred to as a target critical threshold.

It should be first noted that, in a process that a user uses a stylus, in this embodiment of this application, the operation of learning the critical threshold and the operations of the embodiments shown in FIG. 2 to FIG. 8 may be performed in parallel or may be performed in series, which may be specifically set based on an actual requirement. This is not limited herein. Detailed descriptions are as follows:

When the operations are performed in parallel, in this embodiment of this application, the operation of learning the critical threshold and the step operations in the embodiments shown in FIG. 2 to FIG. 8 may be processed by two independent processes of the terminal device. In this case, the terminal device may perform the operations simultaneously. In this case, if the terminal device obtains the critical threshold according to the learning method in this embodiment of this application before the operations S303 and S3031 of obtaining the critical threshold, the critical threshold obtained according to the learning method in this embodiment of this application may be obtained in the operations of S303 and S3031.

When the operations are performed in series, the operation of learning the critical threshold in this embodiment of this application may be combined into solution logic of the embodiments shown in FIG. 2 to FIG. 8 as a refined operation of one step therein. For example, in the operation processes of S303 and S3031 of obtaining the critical threshold, if the required critical threshold is not read, this embodiment of this application may be performed. Alternatively, the critical threshold of another region is not found within the preset region range in S3032, this embodiment of this application may be performed.

Specifically, a trigger condition may be set to determine when to perform this embodiment of this application. For example, in an optional embodiment of this application, the trigger condition of critical threshold learning may be set to any one of the following conditions:

Trigger condition 1: The terminal device is in a stylus mode or detects a stylus, and a pressure value of the stylus obtained by the terminal device is not 0.

Trigger condition 2: A pressure value of a stylus obtained by the terminal device is not 0, and an obtained signal quantity of a coupling signal is greater than a preset basic threshold.

Trigger condition 3: A pressure value of a stylus obtained by the terminal device is not 0, an obtained signal quantity of a coupling signal is greater than a preset basic threshold, and it is detected that a handwriting length written this time is greater than a length threshold.

Specific values of the basic threshold and the length threshold may be set by a technician and are not limited herein.

Figure 9A:
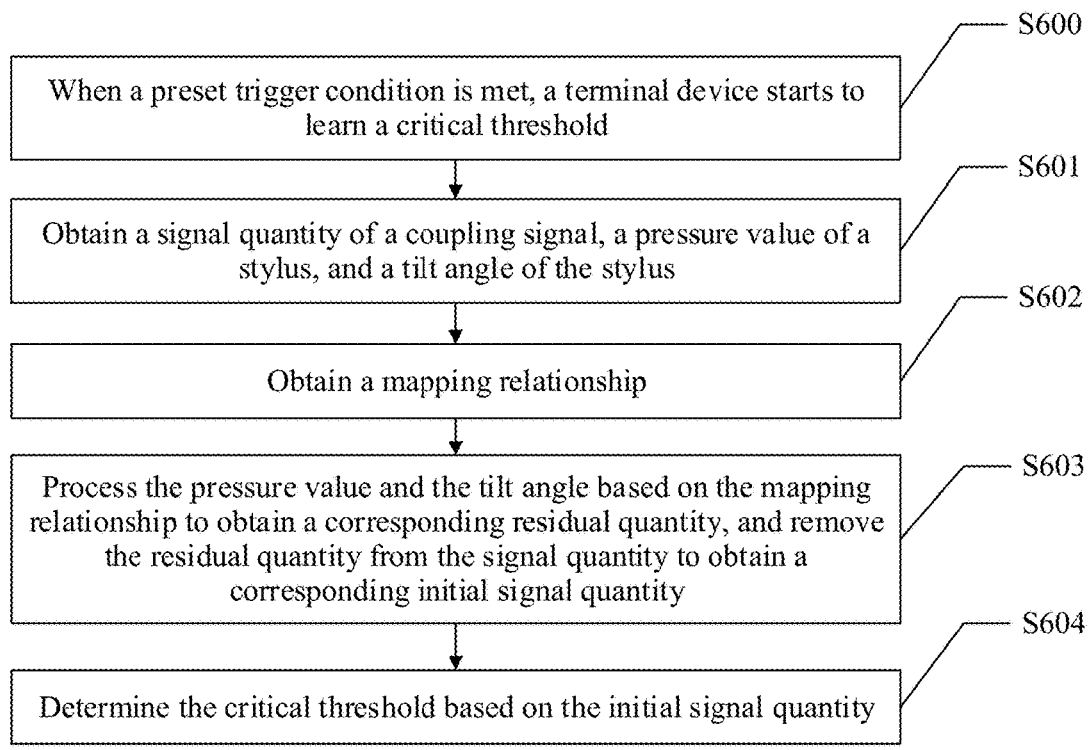
FIG. 9A is a schematic flowchart of a critical threshold learning method according to an embodiment of this application.
Figure 9B:
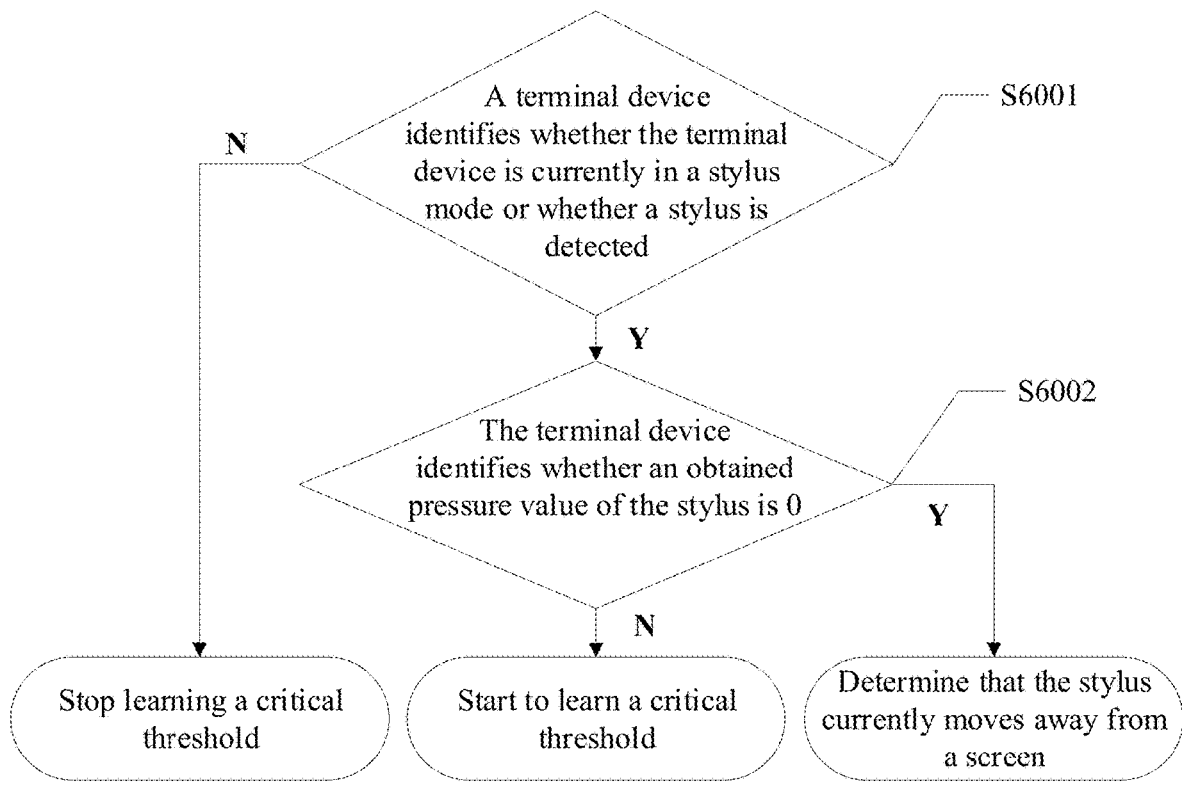
FIG. 9B is a schematic flowchart of starting to learn a critical condition according to an embodiment of this application.

In an optional embodiment of this application, corresponding to the trigger condition 1, refer to FIG. 9B, which is a schematic flowchart of starting to learn a critical condition according to an embodiment of this application. In this embodiment of this application, S600 may be replaced with S6001 and S6002. Detailed descriptions are as follows:

S6001. A terminal device identifies whether the terminal device is currently in a stylus mode or whether a stylus is detected If it is detected that the terminal device is in a stylus mode or a stylus is detected, S6002 is performed.

If nothing is detected, the terminal device may stop learning a critical threshold.

S6002. The terminal device identifies whether an obtained pressure value of the stylus is 0 If the pressure value is not 0, the terminal device starts to learn a critical threshold. If the pressure value is 0, the terminal device may determine that the stylus currently moves away from a screen.

During actual application, any one or more of the trigger conditions 1 to 3 may be selected as the trigger condition is S300. When a plurality of trigger conditions are selected simultaneously, an "AND" or "OR" logic relationship may be selected for processing. For example, when the "AND" logic relationship is used for processing, the terminal device may determine, when meeting the plurality of selected trigger conditions simultaneously, to start to learn the critical threshold. When the "OR" logic relationship is used for processing, the terminal device may start, when meeting any selected trigger condition, to learn the critical threshold.

It should be understood that, in a process that the user actually uses the stylus, the trigger condition of critical threshold learning may be triggered for a plurality of times, so that critical threshold learning may also be performed for a plurality of times in this embodiment of this application. For example, assuming that the trigger condition includes determining whether the trigger condition is met based on the obtained pressure value and/or signal quantity, for example, the trigger condition 1 and the trigger condition 2, in this case, every time the terminal device obtains a new pressure value and/or signal quantity, the trigger conditions may be met sequentially, so that the terminal device starts to learn a new critical threshold. By updating and learning the critical threshold, in this embodiment of this application, the critical threshold obtained through learning may better meet actual situations of the terminal device and the stylus, thereby improving the validity and real-time performance of the critical threshold.

S601. Obtain a signal quantity of a coupling signal, a pressure value of a stylus, and a tilt angle of the stylus.

This embodiment of this application and the operations of the embodiments shown in FIG. 2 to FIG. 8 may be performed in parallel or may be performed in series. Therefore, the signal quantity and the pressure value obtained in this embodiment of this application and the pressure value and the signal quantity obtained in the embodiments shown in FIG. 2 to FIG. 8 may be same data or may be different data. Details need to be determined based on an actual application situation. For ease of distinguishing, in this embodiment of this application, the pressure value and the signal quantity used in the embodiments shown in FIG. 2 to FIG. 8 may be referred to as a first pressure value and a first signal quantity (that is, a first signal strength). The pressure value and the signal quantity obtained through critical threshold learning in this embodiment of this application may be referred to as a second pressure value and a second signal quantity (the second signal quantity may also be referred to as a second signal strength). There are a plurality of first pressure values (used for analyzing the change trend), so that the second pressure value may be a pressure value in the first pressure values, for example, a latest pressure value in the first pressure values, or may be a pressure value that is independent of the first pressure values. The second signal quantity and the first signal quantity may be the same signal quantity or may be two signal quantities that are independent of each other.

During actual application, when the user uses the stylus to write, the signal quantity obtained by the terminal device may be affected by both force applied by the user to the stylus and a contact area between a stylus tip of the stylus and the screen.

For influence of the applied force, assuming that other variants remain constant, in a valid range that the applied force may be detected by the stylus or the terminal device, theoretically, larger force applied by the user to the stylus indicates a larger signal quantity in this case. For example, refer to the instance shown in FIG. 3, in a case that the terminal device and the stylus are fixed and a tilt angle of the stylus relative to the screen remains unchanged, when the user continues to apply force to the stylus in a case that the stylus tip is just in contact with the screen, the signal quantity may be improved from 6200 to 6800. The force applied by the user to the stylus may be represented as the pressure value of the stylus, and it can be learned that the pressure value may affect the signal quantity obtained by the terminal device.

Figure 10:
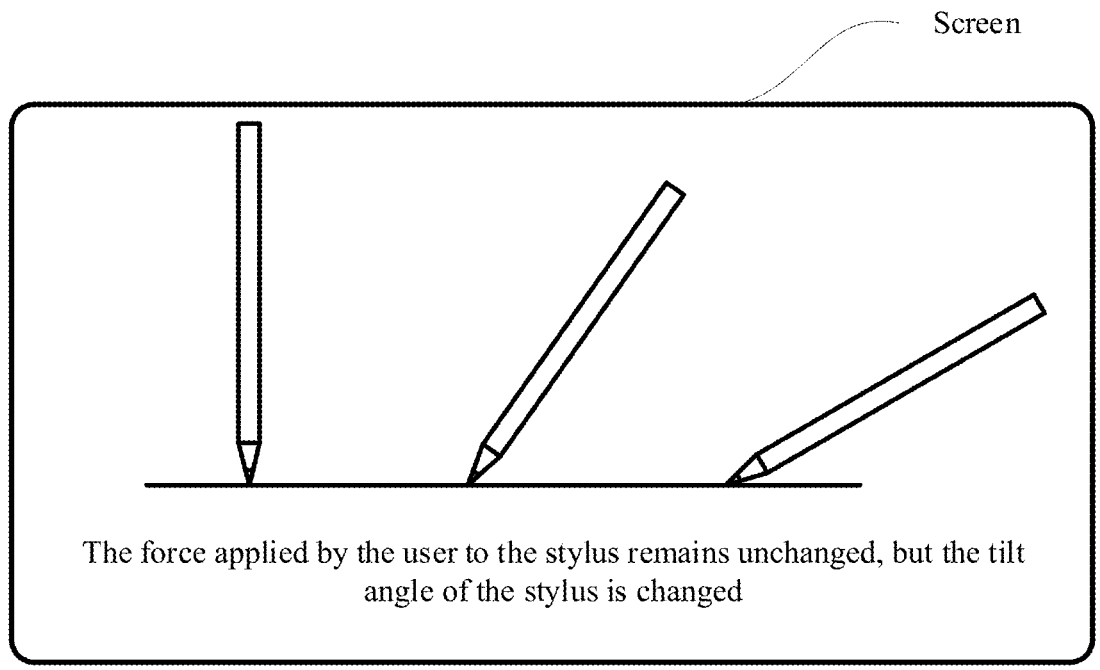
FIG. 10 is a schematic diagram of a scenario in which a stylus writes at different tilt angles according to an embodiment of this application.
Figure 10:
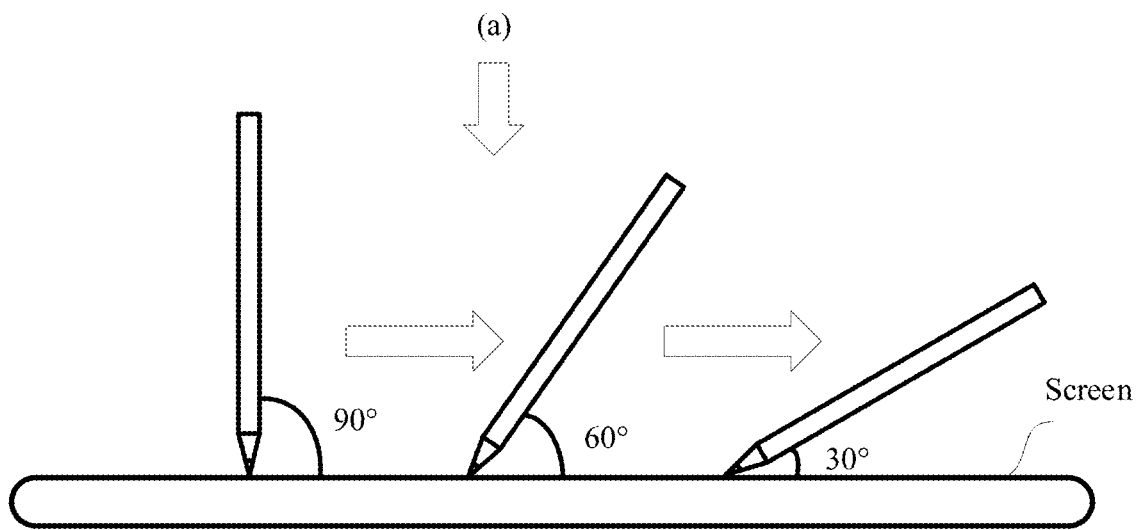

The contact area between the stylus tip of the stylus and the screen may be represented as a tilt angle between the stylus and the screen, and a larger tilt angle indicates a larger contact area between the stylus tip of the stylus and the screen. Therefore, influence of the contact area between the stylus tip of the stylus and the screen may be quantized as influence of the tilt angle of the stylus on the signal quantity. During actual application, assuming that other variants remain constant, in a valid range that the tilt angle may be detected by the stylus, theoretically, a smaller tilt angle of the stylus indicates a larger signal quantity. A description is provided by using an instance, refer to FIG. 10, which is a schematic diagram of a scenario in which a stylus writes at different tilt angles according to an embodiment of this application. Assuming that in a process that the user writes, the force applied to the stylus remains constant, but the tilt angle of the stylus is changed from 90 degrees to 60 degrees and then to 30 degrees. In this case, refer to (a) and (b) in FIG. 10, when the tilt angle is 90 degrees, the signal quantity is 6500, when the tilt angle is reduced to 60 degrees, the signal quantity is increased to 6800, and when the tilt angle is reduced to 30 degrees, the signal quantity is increased to 7000. In an optional embodiment of this application, a value range of the tilt angle of the stylus is from 0 degree to 90 degrees.

It may be learned from the foregoing analysis that, to obtain a corresponding critical threshold applicable to the state that the stylus is just separated from the screen, a signal quantity brought by the pressure value and the tilt angle (the signal quantity brought by the pressure value or the tilt angle is referred to as a residual quantity or a residual signal quantity below) needs to be removed from the signal quantity that is normally obtained. Therefore, in this embodiment of this application, while obtaining the signal quantity of the coupling signal, the terminal device may also obtain a corresponding real-time pressure value and a corresponding real-time tilt angle of the stylus. The tilt angle may be actively detected by the stylus and sent to the terminal device. In this embodiment of this application, the obtained tilt angle of the stylus may also be referred to as a target tilt angle.

S602. Obtain a mapping relationship.

In this embodiment of this application, a technician may perform quantitative evaluation on the influence of the pressure value and the tilt angle on the signal quantity in advance, to obtain a correspondence between a pressure value change and the residual quantity and a relationship between a tilt angle change and the residual quantity (the two relationships are collectively referred to as a mapping relationship in this embodiment of this application). Based on this, the terminal device may continue to obtain a corresponding mapping relationship after obtaining an actual pressure value and an actual tilt angle of the stylus. Quantitative evaluation of the mapping relationship is not limited in this embodiment of this application.

In an optional embodiment of this application, any quantitative evaluation method below may be used to obtain the mapping relationship:

Quantitative evaluation method 1: A control variable method is used, every time only the pressure value or the tilt angle is used as an independent variable, and the corresponding signal quantity is used as a dependent variable. By adjusting different independent variable values, a plurality of corresponding dependent variable values may be obtained. A function fitting manner is then used, to perform function fitting on the plurality of obtained independent variable values and dependent variable values, to obtain a corresponding function relationship.

In this case, the pressure value and the tilt angle each have a corresponding function relationship, and the two function relationships may be respectively used as the mapping relationships of the pressure value and the tilt angle. Therefore, in S602, the mapping relationship corresponding to the pressure value and the mapping relationship corresponding to the tilt angle may be obtained, which are two independent mapping relationships.

Quantitative evaluation method 2: A control variable method is used, the pressure value and the tilt angle are used as an independent variable simultaneously, and the corresponding signal quantity is used as a dependent variable. By adjusting different independent variable values, a plurality of corresponding dependent variable values may be obtained. A function fitting manner is then used, to perform function fitting on the plurality of obtained independent variable values and dependent variable values, to obtain a corresponding function relationship.

In this case, the pressure value and the tilt angle share a function relationship, and the function relationship may be used as a mapping relationship corresponding to the pressure value and the tilt angle. Therefore, in S602, one mapping relationship may be obtained.

During actual application, the function relationship between the pressure value and the residual quantity and the function relationship between the tilt angle and the residual quantity are generally linear functions. Therefore, to simplify the mapping relationship and improve the computing efficiency of the terminal device, when function fitting is performed by using the quantitative evaluation method 1 and the quantitative evaluation method 2, linear function fitting may be performed, to obtain corresponding linear mapping relationships.

S603. Process the pressure value and the tilt angle based on the mapping relationship to obtain a corresponding residual quantity, and remove the residual quantity from the signal quantity to obtain a corresponding initial signal quantity.

After obtaining the mapping relationship, function substitution calculation may be performed on the pressure value and the tilt angle through the mapping relationship, to obtain the corresponding residual quantity (also may be referred to as a residual signal strength). Based on this, by subtracting the residual quantity from the actually obtained signal quantity, a signal quantity that is theoretically not affected by the applied force and the contact area (referred to as an initial signal quantity in this embodiment of this application) in the state that the stylus is just separated from the screen may be obtained.

A description is provided by using an instance, assuming that the foregoing quantitative evaluation method 1 is used to obtain the mapping relationship, and a finally obtained mapping relationship is:

the mapping relationship between the pressure value and the residual quantity: $y1=a \times x1$, where $x1$ is the pressure value, $y1$ is the residual quantity corresponding to the pressure value, a is a pressure compensation coefficient, and a is a constant;

the mapping relationship between the tilt angle and the residual quantity: $y2=b \times x2$, where $x2$ is the tilt angle, $y2$ is the residual quantity corresponding to the pressure value, b is an angle compensation coefficient, and b is a constant; and specific values of a and b may be determined through linear function fitting.

Figure 11:
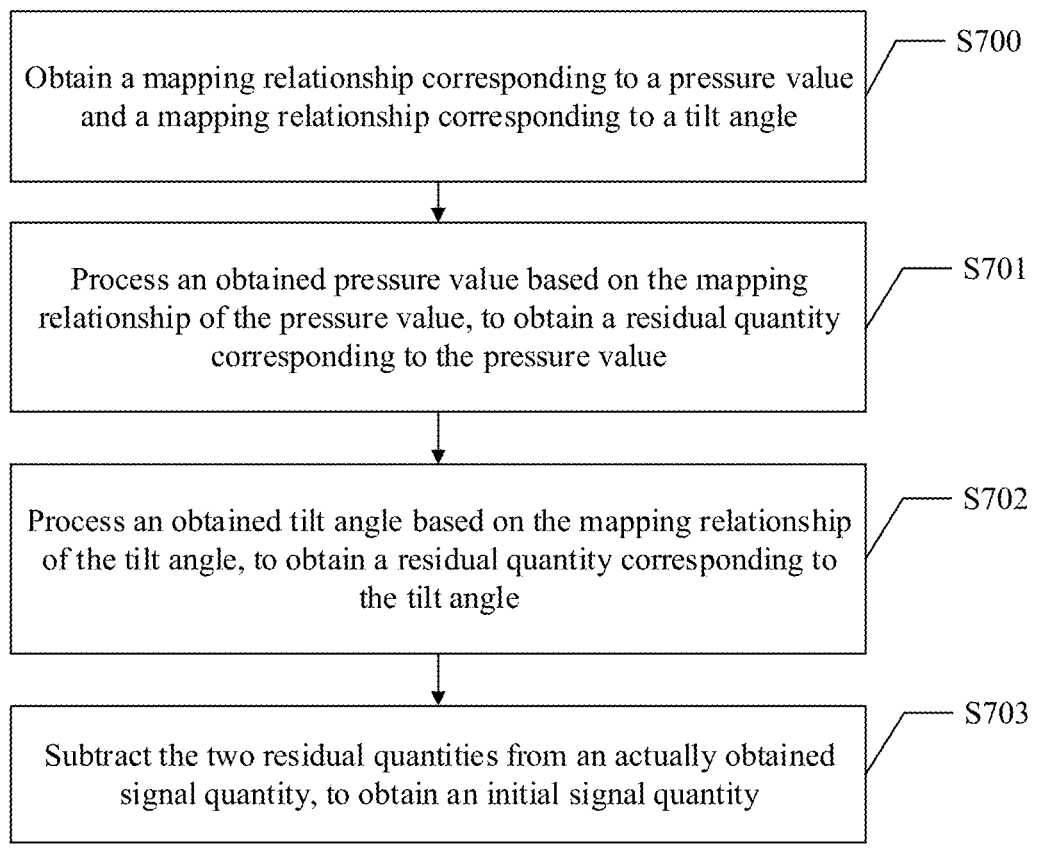
FIG. 11 is a schematic flowchart of calculating an initial signal quantity according to an embodiment of this application.

Refer to FIG. 11, which is a schematic flowchart of obtaining an initial signal quantity by respectively calculating residual quantities based on a pressure value and a tilt angle according to an embodiment of this application. In this case, S602 and S603 may be replaced with:

S700. Obtain a mapping relationship corresponding to the pressure value and a mapping relationship corresponding to the tilt angle.

S701. Process the obtained pressure value based on the mapping relationship of the pressure value, to obtain a residual quantity corresponding to the pressure value.

S702. Process the obtained tilt angle based on the mapping relationship of the tilt angle, to obtain a residual quantity corresponding to the tilt angle.

S703. Subtract the two residual quantities from the actually obtained signal quantity, to obtain an initial signal quantity.

S604. Determine the critical threshold based on the initial signal quantity.

If no critical threshold exists, the initial signal quantity is used as the critical threshold; and if a critical threshold already exists, the initial signal quantity is compared with the current critical threshold, and the initial signal quantity is updated as a new critical threshold when the initial signal quantity is greater than the current critical threshold.

During actual application, the critical threshold may be learned for a plurality of times. Therefore, every time an initial signal quantity is obtained, a historically recorded critical threshold may already exist. Based on this, after the initial signal quantity is obtained, if the terminal device currently has no critical threshold, the initial signal quantity may be used as the critical threshold; and if the terminal device already has a critical threshold, the critical threshold is compared with the initial signal quantity. When the initial signal quantity is greater than the critical threshold, the initial signal quantity is used as a new critical threshold, so that the sensibility in identifying the state that the stylus is just separated from the screen may be improved, and a speed of identifying separation of the stylus from the screen may be improved. In an optional embodiment of this application, when the initial signal quantity is less than or equal to the current critical threshold, the current critical threshold may not be updated, and the critical threshold may be still used.

In another optional embodiment of this application, the current critical threshold may alternatively not be considered, and after a smallest initial signal quantity is obtained, the initial signal quantity is used as the critical threshold. In this case, S604 may be replaced with: use the initial signal quantity as the critical threshold.

In an optional embodiment of this application, based on the principle described in the embodiment shown in FIG. 9A, only the influence of the force applied by the user to the stylus on the signal quantity may be considered, or only the influence of the contact area between the stylus tip of the stylus and the screen on the signal quantity may be considered. Correspondingly, in S601, a signal quantity and a pressure value may be obtained, or a signal quantity and a tilt angle may be obtained. The mapping relationship obtained in S602 may be a mapping relationship corresponding to the pressure value or may be a mapping relationship corresponding to the tilt angle. In S603, a residual quantity of the signal quantity or the pressure value is obtained, and a corresponding initial signal quantity is calculated. Other steps are the same as the embodiment shown in FIG. 9A, and details are not described herein again.

In this embodiment of this application, the mapping relationships of the pressure value and the tilt angle are created, and the corresponding residual quantities are calculated based on the mapping relationships and the actual pressure value and tilt angle, and the calculated residual quantities are removed from the actual signal quantity to obtain the initial signal quantity. Therefore, in this embodiment of this application, the influence of the force applied by the user to the stylus on the signal quantity may be effectively eliminated, and the influence of the content area between the stylus tip of the stylus and the screen on the signal quantity may also be effectively eliminated. Therefore, the obtained initial signal quantity may be more close to an actual signal quantity in the state that the stylus is just separated from the screen. The critical threshold is then determined based on the initial signal quantity, so that the validity of the critical threshold may be improved, and the accuracy in identifying separation of the stylus from the screen may be improved.

In addition, in this embodiment of this application, in a process that the user normally uses the stylus to write on the screen, a suitable critical threshold may be obtained through self-adaptive learning. Compared with setting a fixed critical threshold, this embodiment of this application may effectively adapt to various different terminal device situations and stylus situations, and the critical threshold may be updated in time as the terminal device situation and the stylus situation change. Therefore, the critical threshold obtained in this embodiment of this application has stronger adaptability and high flexibility to an actual application situation, and the validity of the critical threshold is high.

In another optional embodiment of this application, considering that during actual application, hardware situations at different positions of the screen may be different, during actual application, when the stylus is in the state of being just separated from the different positions of the screen, signal quantities detected by the terminal device may also be different. Based on this, to improve the validity of the critical threshold obtained through learning, that is, to improve the accuracy in detecting the state that the stylus is just separated from the screen, in this embodiment of this application, the screen may be divided into a plurality of different regions in advance, and each region is used as an independent critical threshold setting object. In this embodiment of this application, a division rule of the regions is not limited. For example, division may be performed with reference to the embodiment shown in FIG. 6 or another related embodiment.

Figure 12:
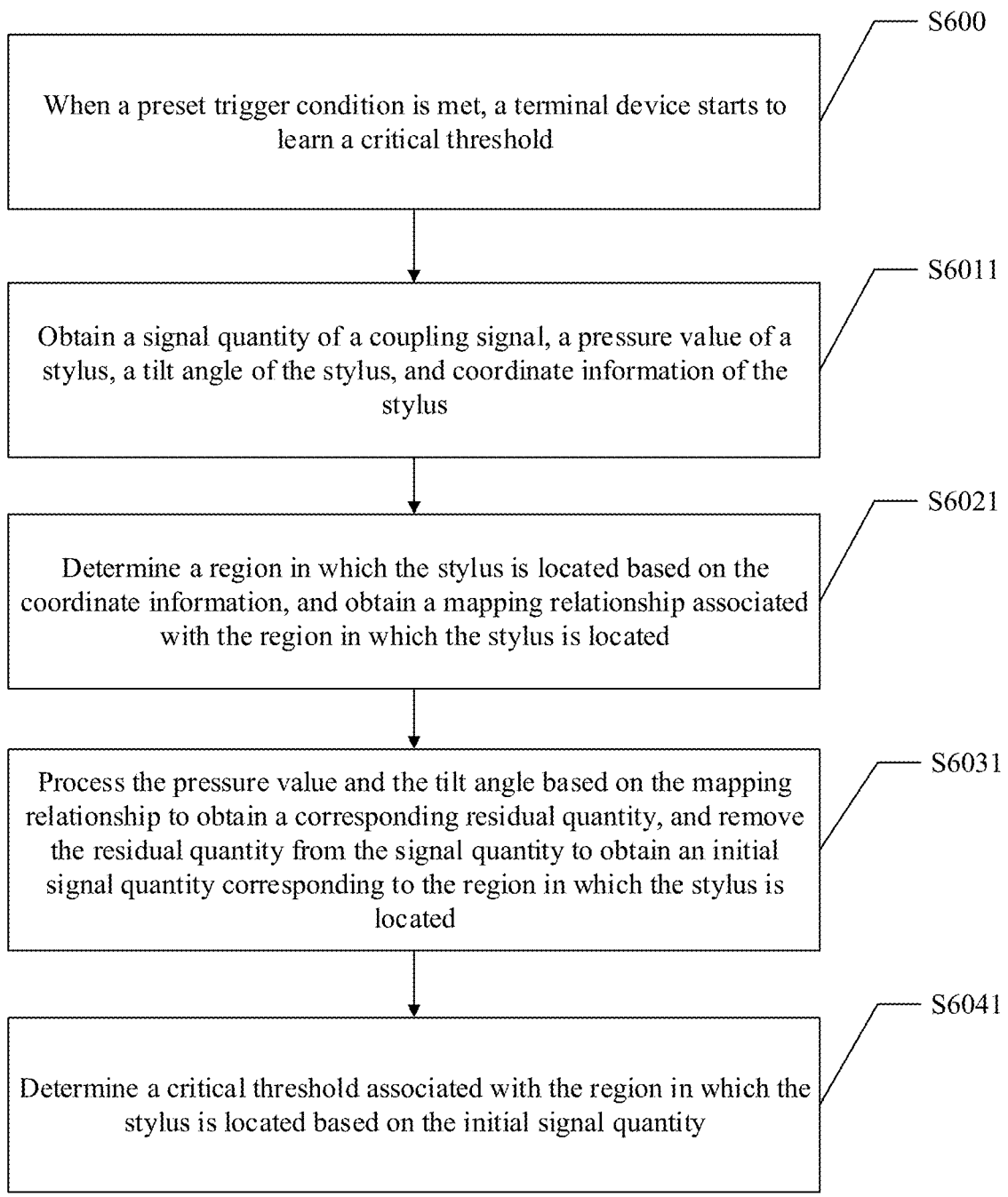
FIG. 12 is another schematic flowchart of a critical threshold learning method according to an embodiment of this application.

Based on the premise of performing region division on the screen, in this case, solution refining may be performed on the embodiment shown in FIG. 9A. Specifically, refer to FIG. 12, which is a schematic flowchart of a critical threshold learning method according to an embodiment of this application. Detailed descriptions are as follows:

S600. When a preset trigger condition is met, S6011 is performed, and a terminal device starts to learn a critical threshold.

For details, refer to the related description of S600 in the embodiment shown in FIG. 9A, and details are not described herein again.

S6011. Obtain a signal quantity of a coupling signal, a pressure value of a stylus, a tilt angle of the stylus, and coordinate information of the stylus.

S6021. Determine a region in which the stylus is located based on the coordinate information, and obtain a mapping relationship associated with the region in which the stylus is located.

The region in which the stylus is located may also be referred to as a second region in this embodiment of this application. This embodiment of this application and the operations of the embodiments shown in FIG. 2 to FIG. 8 may be performed in parallel or may be performed in series. Therefore, the second region in which the stylus is located in this embodiment of this application and the first region in which the stylus is located in the embodiments shown in FIG. 2 to FIG. 8 may be a same region or may be different regions.

S6031. Process the pressure value and the tilt angle based on the mapping relationship to obtain a corresponding residual quantity, and remove the residual quantity from the signal quantity to obtain an initial signal quantity corresponding to the region in which the stylus is located.

For details, refer to the related description of S603 in the embodiment shown in FIG. 9A, and details are not described herein again.

S6041. Determine a critical threshold associated with the region in which the stylus is located based on the initial signal quantity.

If the region in which the stylus is located has no associated critical threshold, the initial signal quantity is used as the critical threshold associated with the region in which the stylus is located; and if the region in which the stylus is located already has a critical threshold, the initial signal quantity is compared with the current critical threshold, and the initial signal quantity is updated as a new critical threshold of the region in which the stylus is located when the initial signal quantity is greater than the current critical threshold.

Operation principles, details, and beneficial effects of S6011 to S6041 are approximately the same as those of S601 to S604 in the embodiment shown in FIG. 9A, so that the related descriptions of S601 to S604 may be referred. The following only describes a difference thereof:

In this embodiment of this application, the critical threshold associated with each region of the screen is independent. That is, operations such as learning, setting, and updating the critical threshold associated with each region are independent, so that the mapping relationship corresponding to the pressure value and the tilt angle in each region is independent, and the critical threshold associated with each region may be the same or different.

To determine a region in which the stylus currently writes (that is, the region in which the stylus is located), in this embodiment of this application, refining is performed on S601 to obtain S6011, and the coordinate information of the stylus may be also obtained in this case. After the coordinate information is obtained, refining may be performed on S602 to obtain S6021. In this case, the terminal device may position the region in which the stylus is located based on the coordinate information, and searches for the mapping relationship corresponding to the pressure value and the tilt angle in this region. The residual value is obtained by processing the pressure value and the tilt angle based on the mapping relationship, and the initial signal quantity corresponding to the region in which the stylus is located may be obtained by removing the residual value from the signal quantity, so that S6031 obtained by refining S603 may be obtained. Finally, the suitable critical threshold of the region in which the stylus is located may be determined based on the initial signal quantity, so that S6041 obtained by refining S604 may be obtained.

Compared with the embodiment shown in FIG. 9A, on one hand, this embodiment of this application has all the beneficial effects of the embodiment shown in FIG. 9A, for example, the critical threshold obtained in this embodiment of this application has stronger adaptability and high flexibility to an actual application situation, and the validity of the critical threshold is high. On the other hand, in this embodiment of this application, the critical threshold is learned in a region division manner, so that the critical threshold may be distinguished and learned in a more detailed manner. Therefore, the obtained critical threshold may better adapt to different regions in a same screen, so that when the terminal device subsequently uses the critical threshold to determine whether the stylus moves away from the screen, a determination result is more accurate and reliable. Therefore, according to this embodiment of this application, the validity of the obtained critical threshold may be further improved.

In an optional embodiment of this application, based on the embodiments shown in FIG. 9A to FIG. 12, the terminal device in this embodiment of this application may further perform noise detection after obtaining the signal quantity, and stop learning the critical threshold when large noise exists in the obtained signal quantity. In this case, excessively large noise causing a large error in learning the critical threshold may be prevented, so that the validity of the critical threshold obtained through learning is improved.

Figure 7:
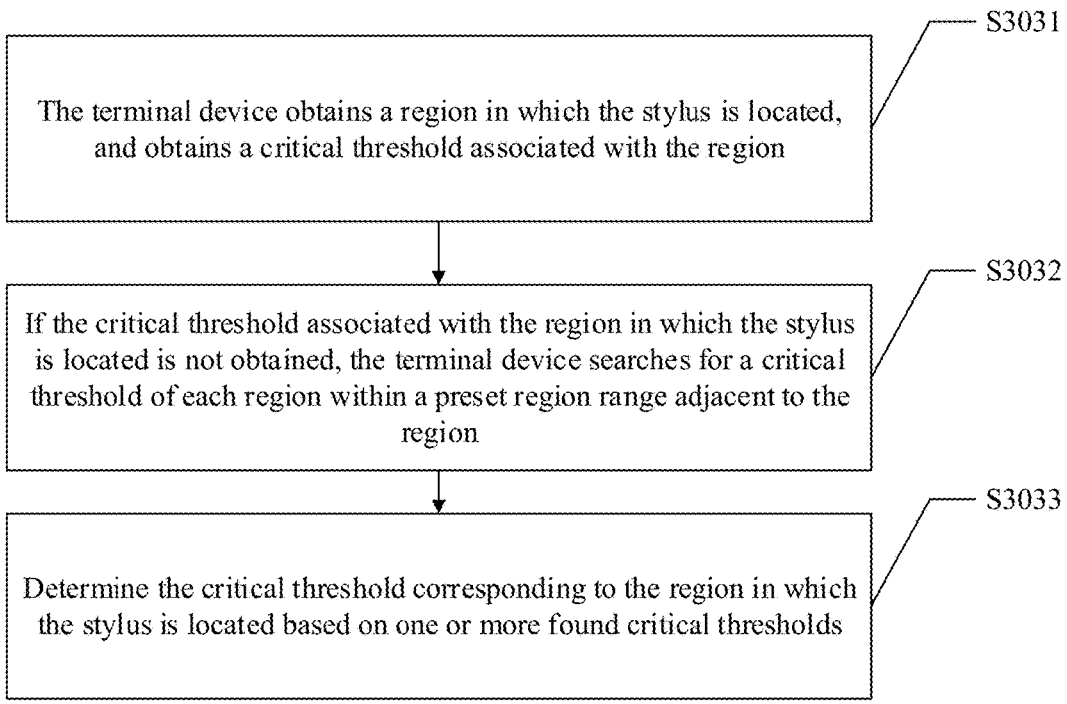
FIG. 7 is a schematic flowchart of a critical threshold obtaining method according to an embodiment of this application.
Figure 13:
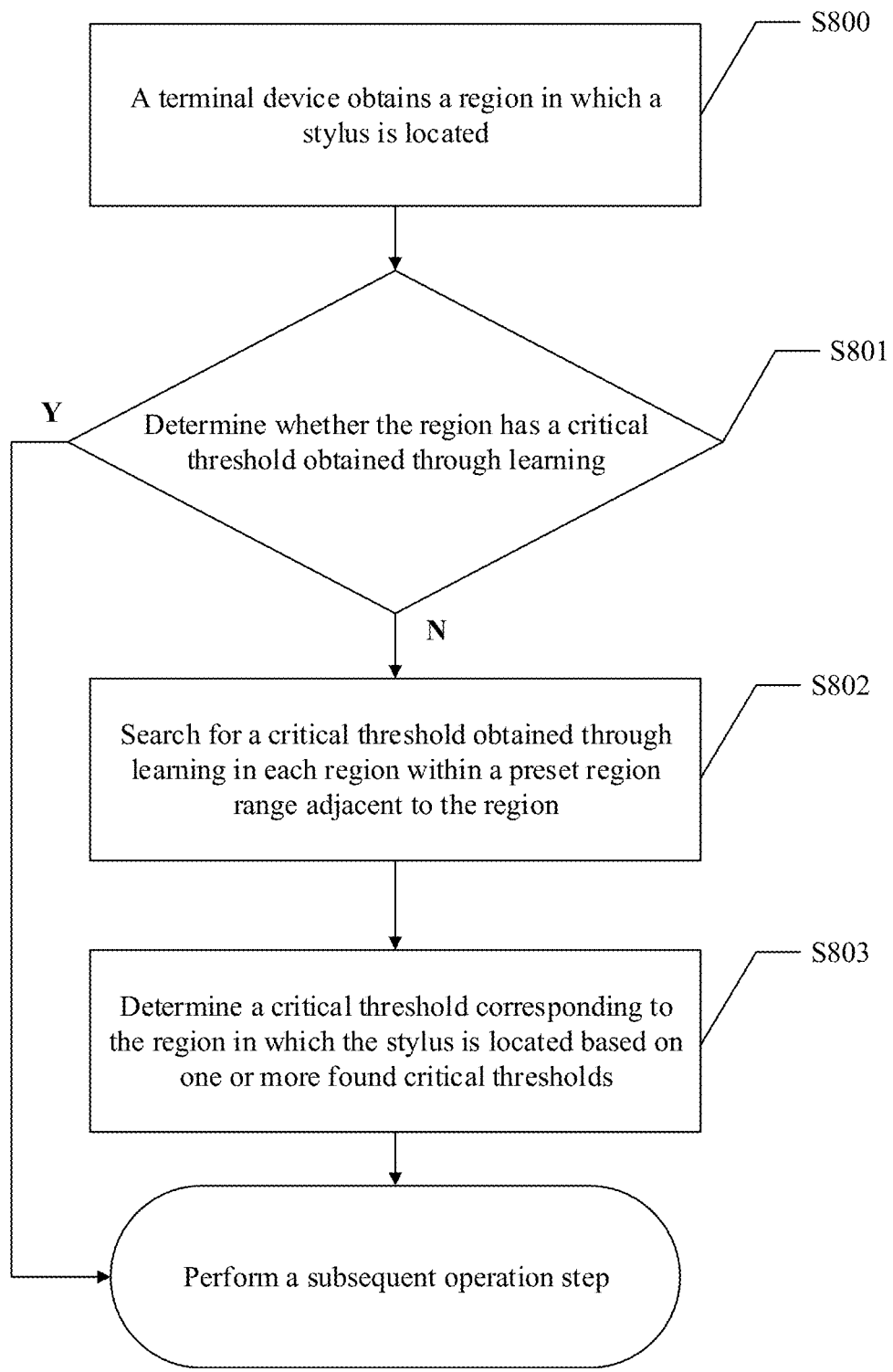
FIG. 13 is still another schematic flowchart of a critical threshold learning method according to an embodiment of this application.

In an optional embodiment of this application, the embodiments shown in FIG. 9A to FIG. 12 may be combined with the embodiment shown in FIG. 7, and a combined embodiment of obtaining the critical threshold may be obtained in this case. Refer to FIG. 13, which is a schematic flowchart of a critical threshold obtaining method according to an embodiment of this application. Detailed descriptions are as follows:

S800. A terminal device obtains a region in which a stylus is located.

S801. Determine whether the region has a critical threshold obtained through learning.

If the region in which the stylus is located has a critical threshold obtained through learning, subsequent operation steps are performed based on the critical threshold, for example, the step S304 of determining whether the signal quantity is less than or equal to the critical threshold.

S802. If the region in which the stylus is located does not have a critical threshold obtained through learning, the terminal device searches for a critical threshold obtained through learning of each region within a preset region range adjacent to the region.

S803. Determine the critical threshold corresponding to the region in which the stylus is located based on one or more found critical thresholds.

Subsequent operation steps are performed based on the critical threshold, for example, the step S304 of determining whether the signal quantity is less than or equal to the critical threshold.

For operation principles, details, and beneficial effects of S800 to S803, refer to the descriptions of the embodiment shown in FIG. 7, the embodiments shown in FIG. 9A to FIG. 12, and other related embodiments, and details are not described herein again.

Figure 14:
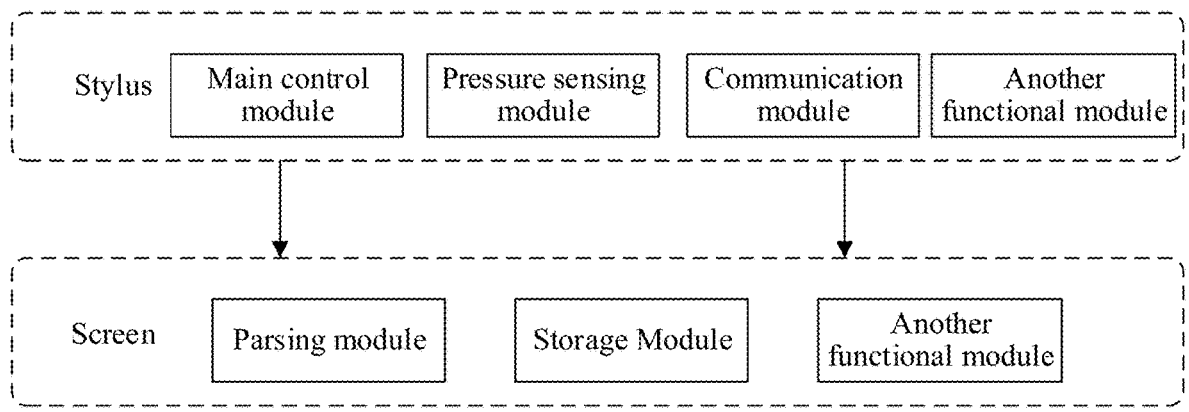
FIG. 14 is a schematic structural diagram of a stylus and a touch screen of a terminal device according to an embodiment of this application.

In an optional embodiment of this application, refer to FIG. 14, which is a schematic structural diagram of a stylus and a touch screen of a terminal device according to an embodiment of this application. Detailed descriptions are as follows:

In this embodiment of this application, the stylus includes: a main control module, a pressure sensing module, a communication module, and another functional module, where the another functional module includes but not limited to a posture module and a touch module.

The screen of the terminal device includes: a parsing module, a storage module, and another functional module, where the another functional module includes but not limited to a display control module and a power supply module.

Function descriptions of the modules are as follows:

The main control module of the stylus is mainly configured to control working logic of devices of the stylus, for example, a code marking time sequence, a collection period of a pressure sensor, and the like.

The pressure sensing module of the stylus includes a pressure sensor configured to sense a pressure change of the stylus.

The communication module of the stylus is configured to send a pressure value of the stylus and a coupling signal (also may be referred to as an electrode signal in this embodiment of this application) to the terminal device. The communication module may be a code marking module or a Bluetooth module.

The parsing module of the screen is configured to parse a signal from the stylus, where the signal includes but not limited to a pressure value, a tilt angle, and the like. The parsing module is further configured to calculate coordinate information or a tilt angle of a stylus tip of the stylus (Based on different actual applications, the tilt angle of the stylus may be calculated by the stylus or may be calculated by the screen of the terminal device).

The storage module of the screen is configured to store some data such as state information, for example, a critical threshold obtained through learning.

Figure 15:
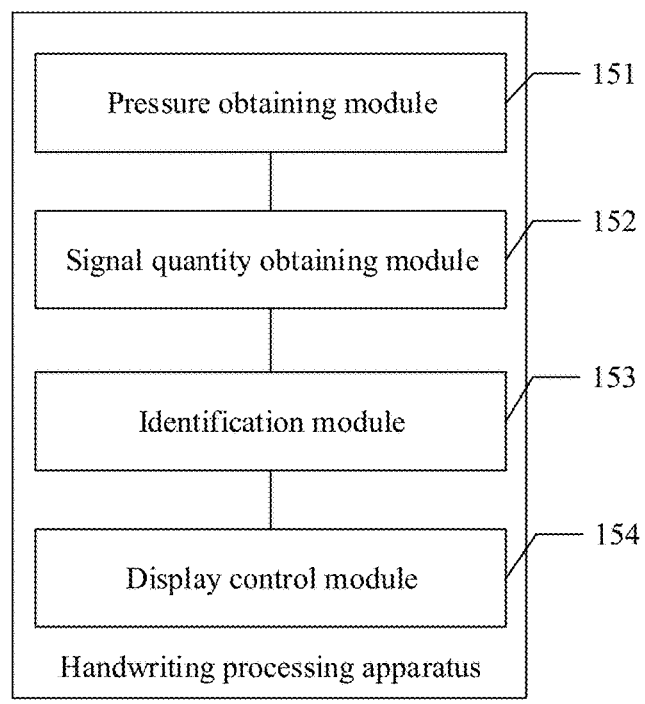
FIG. 15 is a schematic structural diagram of a handwriting processing apparatus according to an embodiment of this application.

Corresponding to the handwriting processing method described in the foregoing embodiments, FIG. 15 is a schematic structural diagram of a handwriting processing apparatus according to an embodiment of this application, and only parts related to this embodiment of this application are shown for ease of description.

Refer to FIG. 15, the handwriting processing apparatus includes a handwriting module, the handwriting module is provided for a stylus to input handwriting content, and the handwriting processing apparatus includes:

a pressure obtaining module 151, configured to obtain a first pressure value within a preset time range, where the first pressure value is a pressure value applied by a user to the stylus or a pressure value applied by the stylus to the handwriting module, and an end moment of the preset time range is a current moment;

a signal quantity obtaining module 152, configured to obtain a latest first signal strength, where the first signal strength is a signal strength of a coupling signal between the terminal device and the stylus;

an identification module 153, configured to identify, based on the first pressure value and the first signal strength, whether the stylus moves away from the handwriting module; and a display control module 154, configured to stop, when identifying that the stylus moves away from the handwriting module, displaying to-be-displayed handwriting content inputted by the stylus on the handwriting module within a first time range after the current moment, or stop responding to several target coupling signals, where the target coupling signals are coupling signals that are obtained after the current moment between the stylus and the terminal device.

Corresponding to the critical threshold learning method in the foregoing embodiments, an embodiment of this application provides a critical threshold learning apparatus. The critical threshold learning apparatus includes a handwriting module, and the critical threshold learning apparatus includes:

a data obtaining module, configured to obtain a latest second pressure value, a latest second signal strength, and a latest target tilt angle between a stylus and the handwriting module, where the second pressure value is a pressure value applied by a user to the stylus or a pressure value applied by the stylus to the handwriting module, and the second signal strength is a signal strength of a coupling signal between the terminal device and the stylus;

a mapping obtaining module, configured to obtain a mapping relationship among a pressure value, a tilt angle, and a signal strength;

a residual calculation module, configured to determine a residual signal strength based on the second pressure value, the target tilt angle, and the mapping relationship;

a residual removing module, configured to remove the residual signal strength from the second signal strength to obtain an initial signal strength; and a threshold determining module, configured to determine a target critical threshold based on the initial signal strength, where the target critical threshold is used for performing comparison with a first signal strength of a latest coupling signal between the terminal device and the stylus, to identify whether the stylus moves away from the handwriting module.

For processes that the modules in the handwriting processing apparatus and the critical threshold learning apparatus implement respective functions, refer to the descriptions of the embodiment shown in FIG. 2 to FIG. 13 and other related method embodiments, and details are not described herein again.

It should be noted that, content such as information interaction and an execution process between the apparatuses/units is based on a same concept as that in the method embodiments of this application. Therefore, for specific functions and technical effects brought by the apparatuses/units, refer to the method embodiment parts. Details are not described herein again.

It should be understood that sequence numbers of the steps in the foregoing embodiments do not mean execution sequences. The execution sequences of the processes should be determined based on functions and internal logic of the processes, and should not be construed as any limitation on the implementation processes of embodiments of this application.

It should be understood that when being used in this specification and the appended claims of this application, the term "include" indicates presence of a described feature, entirety, step, operation, element, and/or component, but does not exclude presence or addition of one or more other features, entireties, steps, operations, elements, components, and/or sets thereof.

It should be further understood that the term "and/or" used in this specification and the appended claims of this application refers to one or more of any and all possible combinations of the associated items that are listed, and the combinations are included.

As used in this specification and the appended claims of this application, the term "if" may be interpreted as "when" or "once" or "in response to determining" or "in response to detecting" according to the context. Similarly, the phrase "if it is determined" or "if a [described condition or event] is detected" may be interpreted according to the context as "once it is determined", "in response to determining", "once the [described condition or event] is detected", or "in response to detecting the [described condition or event]".

In addition, in the descriptions of this specification and the appended claims of this application, the terms "first", "second", "third", and the like are merely used to distinguish between the descriptions, and cannot be understood as indicating or implying relative importance. It should be further understood that, although the terms "first", "second", and the like are used in text to describe various elements in some embodiments of this application, the elements should not be limited by the terms. The terms are only used to distinguish one element from another element. For example, a first table may be referred to as a second table, moreover, similarly, the second table may be referred to as the first table without departing from a scope of various described embodiments. The first table and the second table are both tables but are not the same table.

Reference to "an embodiment" or "some embodiments" described in this specification of this application means that one or more embodiments of this application include a particular feature, structure, or characteristic described in combination with the embodiment. Therefore, the statements "in an embodiment", "in some embodiments", "in some other embodiments", "in further embodiments", and the like in different places in this specification do not necessarily refer to the same embodiment, but mean "one or more but not all embodiments", unless otherwise specially emphasized in other ways. The terms "include", "comprise", and "have" and variants thereof all mean "include but are not limited to", unless otherwise specially emphasized in other ways.

A terminal device (Terminal Equipment) may also be referred to as user equipment (User Equipment), a mobile station (Mobile Station, MS), a mobile terminal (Mobile Terminal), and the like.

The handwriting processing method provided in the embodiments of this application may be applied to a terminal device, such as a mobile phone, a tablet computer, a writing pad, a drawing board, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA). A specific type of the terminal device is not limited in the embodiments of this application.

For example, the terminal device may be a station (STATION, ST) in a WLAN, a cellular phone, a cordless phone, a session initiation protocol (Session Initiation Protocol, SIP) phone, a wireless local loop (Wireless Local Loop, WLL) station, a personal digital assistant (Personal Digital Assistant, PDA) device, a handheld device with a wireless communication function, a computing device or another processing device connected to a wireless modem, a vehicle-mounted device, an Internet of Vehicles terminal, a computer, a laptop computer, a handheld communication device, a handheld computing device, a satellite wireless device, a wireless modem card, a TV set top box (set top box, STB), customer premise equipment (customer premise equipment, CPE), and/or another device used for communication on a wireless system, or a next-generation communication system, for example, a terminal device in a 5G network or a terminal device in a future evolved public land mobile network (Public Land Mobile Network, PLMN).

By way of example but not limitation, when the terminal device is a wearable device, the wearable device may be a general term for daily wearable devices, such as glasses, gloves, watches, clothing and shoes, developed by applying wearable technologies in intelligent designs of daily wear. A wearable device is a portable device that can be directly worn on a body or integrated into clothes or an accessory of a user. A wearable device is not only a hardware device, but also used to implement a powerful function through software support, data exchange, and cloud interaction. In a broad sense, the wearable smart device may be a full-featured and large-size device that can implement some or all of functions without relying on a smart phone, for example, a smart watch or smart glasses, or a device that focuses only on a specific type of application function and needs to be used together with another device such as a smartphone, for example, various types of smart bands and smart jewelry that monitor physical signs.

Figure 16:
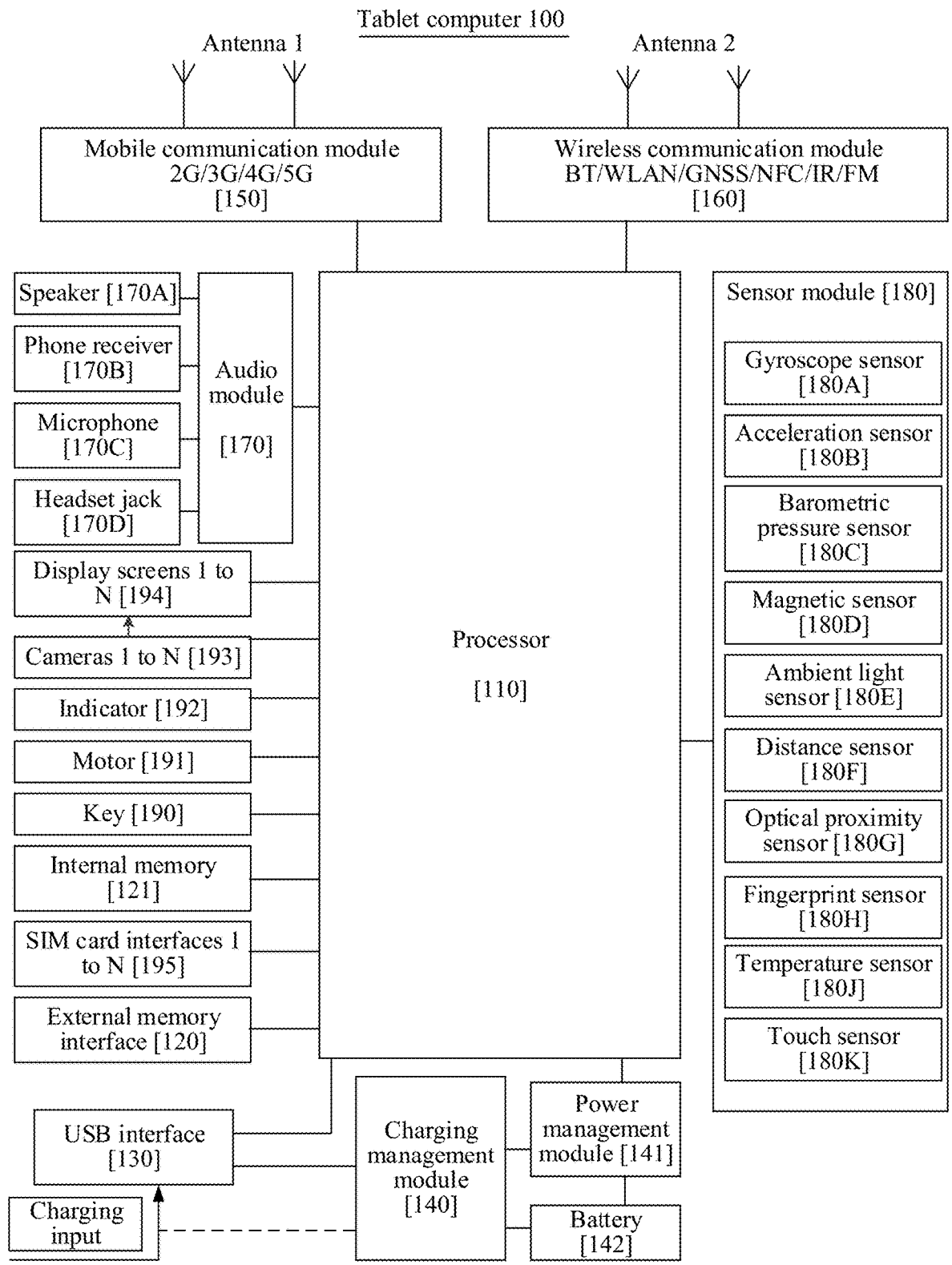
FIG. 16 is a schematic structural diagram of a tablet computer according to an embodiment of this application.

An example in which the terminal device is a tablet computer is used below. FIG. 16 is a schematic structural diagram of a tablet computer 100.

The tablet computer 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a key 190, a motor 191, an indicator 192, a camera 193, a display screen 194 (also referred to as a screen), and an SIM card interface 195. The sensor module 180 may include a gyroscope sensor 180A, an acceleration sensor 180B, a barometric pressure sensor 180C, a magnetic sensor 180D, an ambient light sensor 180E, a distance sensor 180F, an optical proximity sensor 180G, a fingerprint sensor 180H, a temperature sensor 180J, a touch sensor 180K (certainly, the tablet computer 100 may further include other sensors such as a temperature sensor, a pressure sensor, a barometric pressure sensor, a bone conduction sensor, and the like, which are not shown in the figure).

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (Neural-network Processing Unit, NPU). Different processing units may be independent components, or may be integrated into one or more processors. The controller may be a nerve center and a command center of the tablet computer 100. The controller may generate an operation control signal based on instruction operation code and a timing signal, to control instruction fetching and instruction execution.

The processor 110 may further be provided with a memory configured to store instructions and data. In some embodiments, the memory of the processor 110 is a cache. The memory may store instructions or data that is recently used or cyclically used by the processor 110. If the processor 110 needs to use the instructions or the data again, the processor can directly invoke the instructions or the data from the memory. This avoids repeated access, and reduces a waiting time of the processor 110, thereby improving system efficiency.

The processor 110 may perform the handwriting processing method provided in the embodiments of this application to alleviate a situation that a handwriting does not disappear in time, thereby improving user experience. The processor 110 may include different components. For example, when the CPU and the GPU are integrated, the CPU and the GPU may perform the handwriting processing method provided in the embodiments of this application through cooperation. For example, a part of algorithm in the handwriting processing method is performed by the CPU, and the other part of algorithm in the handwriting processing method is performed by the GPU, to achieve relatively high processing efficiency.

The display screen 194 is configured to display an image, a video, and the like. The display screen 194 includes a display panel. The display panel may be a liquid crystal display (liquid crystal display, LCD), an organic light-emitting diode (organic light-emitting diode, OLED), an active-matrix organic light-emitting diode or an active-matrix organic light emitting diode (active-matrix organic light emitting diode, AMOLED), a flexible light-emitting diode (flex light-emitting diode, FLED), a Miniled, a MicroLed, a Micro-oLed, a quantum dot light emitting diode (quantum dot light emitting diodes, QLED), or the like. In some embodiments, the tablet computer 100 may include one or N display screens 194, where N is a positive integer greater than 1. The display screen 194 may be configured to display information entered by the user or information provided to the user, and various graphical user interfaces (graphical user interface, GUI). For example, the display screen 194 may display a picture, a video, a page, a file, or the like. In another example, the display screen 194 may display a graphical user interface. The graphical user interface includes a status bar, a hideable navigation bar, a time and weather widget (widget), and an application icon such as a browser icon. The status bar includes an operator name (for example, China Mobile), a mobile network (for example, 4G), a time, and a remaining battery level. The navigation bar includes a back (back) key icon, a home (home) key icon, and a forward key icon. In addition, it may be understood that, in some embodiments, the status bar may further include a Bluetooth icon, a Wi-Fi icon, an external device icon, and the like. It may be further understood that in some other embodiments, the graphical user interface may further include a Dock bar, where the Dock bar may include icons of commonly used applications. When detecting a touch event of a finger (or a stylus or the like) of the user for an application icon, the processor opens a user interface of an application corresponding to the application icon in response to the touch event and displays the user interface of the application on the display screen 194.

In the embodiments of this application, the display screen 194 may be an integrated flexible display screen or may be a spliced display screen formed by two rigid screens and a flexible screen located between the two rigid screens. After the processor 110 performs the handwriting processing method provided in the embodiments of this application, the processor 110 may control an external audio output device to switch an outputted audio signal.

The camera 193 (a front-facing camera or a rear-facing camera, or a camera may be used as a front-facing camera and a rear-facing camera) is configured to capture a static image or a video. Generally, the camera 193 may include a photosensitive element such as a lens group and an image sensor. The lens group includes a plurality of lenses (convex lenses or concave lenses) and is configured to collect an optical signal reflected by a to-be-photographed object and transmit the collected optical signal to the image sensor. The image sensor generates an original image of the to-be-photographed object based on the optical signal.

The internal memory 121 may be configured to store computer-executable program code, and the executable program code includes instructions. The processor 110 runs the instructions stored in the internal memory 121, to implement various functional applications and data processing of the tablet computer 100. The internal memory 121 may include a program storage region and a data storage region. The program storage region may store an operating system, code of an application program (for example, a camera application or a WeChat application), and the like. The data storage region may store data (for example, an image and a video collected by the camera application) and the like created during use of the tablet computer 100.

The internal memory 121 may further store one or more computer programs corresponding to the handwriting processing method provided in the embodiments of this application. The one or more computer programs are stored in the memory 121 and are configured to be executed by the one or more processors 110. The one or more computer programs include instructions. The instructions may be used to perform steps in corresponding embodiments in FIG. 2 to FIG. 13. The computer programs may include an account verification module and a priority comparison module. The account verification module is configured to verify a system authentication account of another terminal device in a local area network. The priority comparison module may be configured to compare a priority of an audio output request service with a priority of a current output service of the audio output device. A status synchronization module may be configured to synchronize a device status of an audio output device currently accessed by the terminal device to another terminal device, or synchronize a device status of an audio output device currently accessed by another device to a local. When code of the handwriting processing method stored in the internal memory 121 is run by the processor 110, the processor 110 may control the terminal device to perform handwriting data processing.

In addition, the internal memory 121 may include a high-speed random access memory, and may further include a non-volatile memory, such as at least one magnetic disk storage device, a flash memory, or a universal flash storage (universal flash storage, UFS).

Certainly, the code of the handwriting processing method provided in the embodiments of this application may alternatively be stored in an external memory. In this case, the processor 110 may run the code of the handwriting processing method stored in the external memory by using the external memory interface 120, and the processor 110 may control the terminal device to perform handwriting data processing.

A function of the sensor module 180 is described below.

The gyroscope sensor 180A may be configured to determine a motion posture of the tablet computer 100. In some embodiments, angular velocities of the tablet computer 100 around three axes (that is, x, y, and z axes) may be determined by using the gyroscope sensor 180A. That is, the gyroscope sensor 180A may be configured to detect a current motion state of the tablet computer 100, for example, shaking or static.

When the display screen in this embodiment of this application is a foldable screen, the gyroscope sensor 180A may be configured to detect a fold or unfold operation on the display screen 194. The gyroscope sensor 180A may report the detected fold operation or unfold operation as an event to the processor 110 to determine a folded state or an unfolded state of the display screen 194.

The acceleration sensor 180B may detect an acceleration of the tablet computer 100 in each direction (generally three axes). That is, the gyroscope sensor 180A may be configured to detect a current motion state of the tablet computer 100, for example, shaking or static. When the display screen in this embodiment of this application is a foldable screen, the acceleration sensor 180B may be configured to detect a fold or unfold operation on the display screen 194. The acceleration sensor 180B may report the detected fold operation or unfold operation as an event to the processor 110 to determine a folded state or an unfolded state of the display screen 194.

The gyroscope sensor 180A (or the acceleration sensor 180B) may send detected motion state information (for example, an angular velocity) to the processor 110. The processor 110 determines whether the tablet computer is currently in a handheld state or a foot rest state based on the motion state information (for example, when the angular velocity is not 0, it indicates that the tablet computer 100 is in the handheld state).

The fingerprint sensor 180H is configured to collect a fingerprint. The tablet computer 100 may implement fingerprint unlocking, application lock accessing, fingerprint photographing, fingerprint-based call answering, and the like through a feature of the collected fingerprint.

The touch sensor 180K is also called a "touch panel". The touch sensor 180K may be arranged on the display screen 194. The touch sensor 180K and the display screen 194 form a touchscreen, which is also referred to as a "touch screen". The touch sensor 180K is configured to detect a touch operation on or near the touch sensor. The touch sensor may transmit the detected touch operation to the application processor to determine a type of a touch event. The touch sensor 180K may provide a visual output related to the touch operation by using the display screen 194. In some other embodiments, the touch sensor 180K may alternatively be arranged on a surface of the tablet computer 100, and is located on a position different from that of the display screen 194.

For example, the display screen 194 of the tablet computer 100 displays a home screen. The home screen includes icons of a plurality of applications (for example, a camera application and a WeChat application). The user taps/clicks an icon of the camera application in the home screen by using the touch screen 180K to trigger the processor 110 to start the camera application, so as to open the camera 193. The display screen 194 displays an interface of the camera application, for example, a viewfinder interface.

A wireless communication function of the tablet computer 100 may be implemented by using the antenna 1, the antenna 2, the mobile communication module 150, the wireless communication module 160, the modem processor, the baseband processor, and the like.

The antenna 1 and the antenna 2 are configured to transmit or receive electromagnetic wave signals. Each antenna in the tablet computer 100 may be configured to cover one or more communication bands. Different antennas may also be multiplexed to improve utilization of the antennas. For example: the antenna 1 may be multiplexed as a diversity antenna of a wireless local area network. In some other embodiments, the antenna may be used together with a tuning switch.

The mobile communication module 150 may provide wireless communication solutions for use on the tablet computer 100, including 2G, 3G, 4G, 5G, and the like. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering and amplification on the received electromagnetic wave, and send the electromagnetic wave to the modem processor for demodulation. The mobile communication module 150 may further amplify a signal obtained after modulation by the modem processor, and convert the amplified signal into an electromagnetic wave for radiation by using the antenna 1. In some embodiments, at least some functional modules of the mobile communication module 150 may be arranged in the processor 110. In some embodiments, at least some functional modules of the mobile communication module 150 may be arranged in a same device as at least some modules of the processor 110. In this embodiment of this application, the mobile communication module 150 may further be configured to perform information interaction with another terminal device.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator sends, to the baseband processor for processing, the low-frequency baseband signal obtained through demodulation. The low-frequency baseband signal is processed by the baseband processor and then transferred to the application processor. The application processor outputs a sound signal by using an audio device (not limited to the speaker 170A or the phone receiver 170B), or displays an image or a video by using the display screen 194. In some embodiments, the modem processor may be an independent device. In some other embodiments, the modem processor may be independent of the processor 110, and is arranged in a same device as the mobile communication module 150 or another functional module.

The wireless communication module 160 may provide a wireless communication solution that is applied to the tablet computer 100, including a wireless local area network (wireless local area network, WLAN) (such as a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, and the like. The wireless communication module 160 may be one or more devices into which at least one communication processing module is integrated. The wireless communication module 160 receives an electromagnetic wave by using the antenna 2, performs frequency modulation and filtering on an electromagnetic wave signal, and sends a processed signal to the processor 110. The wireless communication module 160 may further receive a to-be-sent signal from the processor 110, perform frequency modulation and amplification on the to-be-sent signal, and convert the to-be-sent signal into an electromagnetic wave for radiation by using the antenna 2. In this embodiment of this application, the wireless communication module 160 may further be configured to access an access point device, to send a message to or receive a message from another terminal device.

In addition, the tablet computer 100 may implement an audio function by using the audio module 170, the speaker 170A, the phone receiver 170B, the microphone 170C, the headset jack 170D, and the application processor, for example, music playing and sound recording. The tablet computer 100 may receive an input of the key 190, and generate a key signal input related to user setting and function control of the tablet computer 100. The tablet computer 100 may generate a vibration prompt (for example, an incoming call vibration prompt) by using the motor 191. The indicator 192 in the tablet computer 100 may be an indicator light, which may be configured to indicate a charging state and a battery change, and may be further configured to indicate a message, a missed call, a notification, and the like. The SIM card interface 195 in the tablet computer 100 is configured to connect to an SIM card. The SIM card may be inserted into the SIM card interface 195 or detached from the SIM card interface 195, to implement contact with or separation from the tablet computer 100.

It should be understood that during actual application, the tablet computer 100 may include more or fewer components than those shown in FIG. 16. This is not limited in this embodiment of this application. The tablet computer 100 shown in the figure is merely an example, and the tablet computer 100 may include more or fewer components than those shown in the figure, or combine two or more components, or have a different component configuration. The components shown in the figure may be implemented by hardware that includes one or more signal processors and/or application-specific integrated circuits, software, or a combination of hardware and software.

Figure 17:
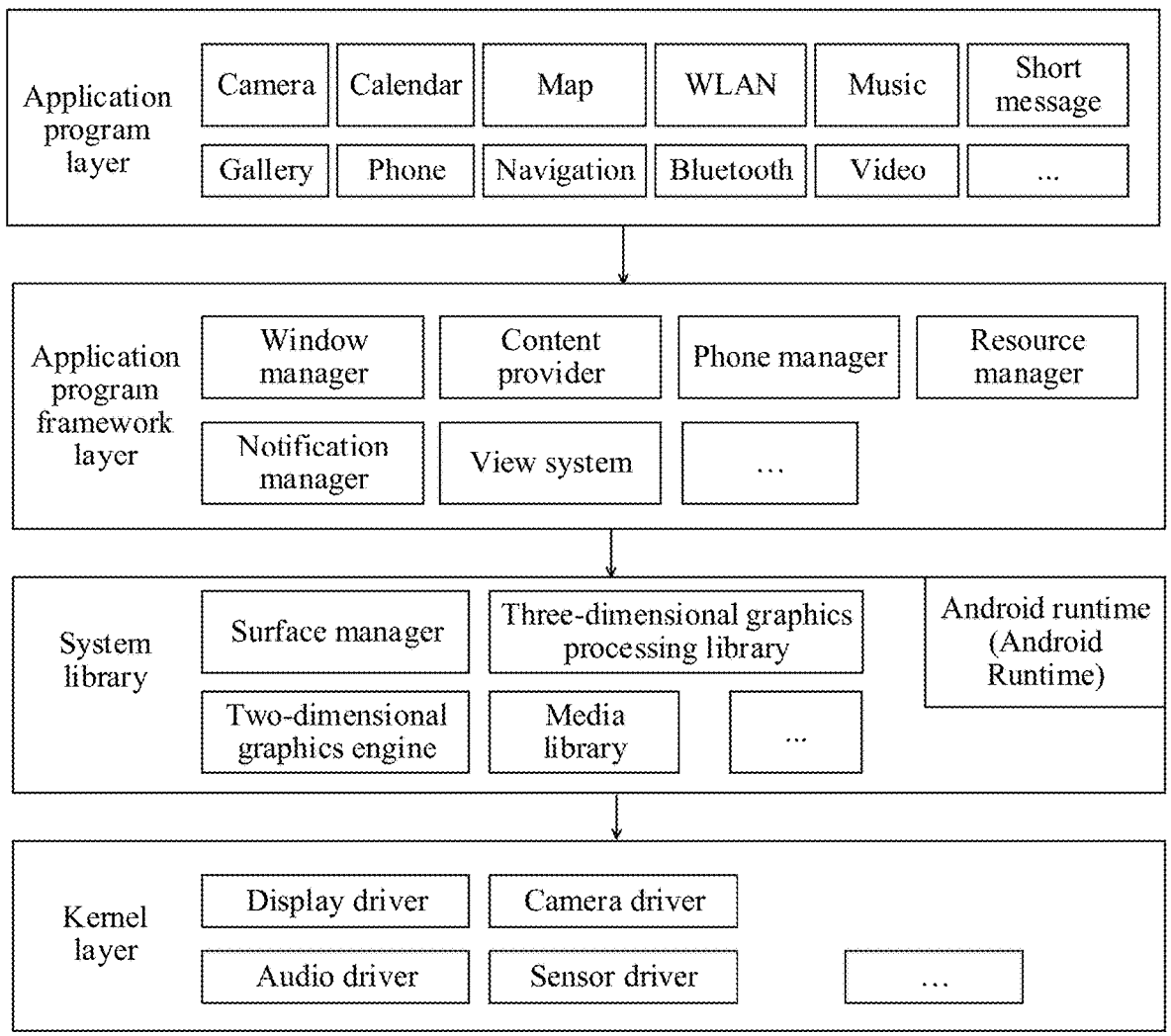
FIG. 17 is a block diagram of a software structure of a terminal device according to an embodiment of this application.

A software system of the terminal device may use a layered architecture, an event-driven architecture, a micro-kernel architecture, a micro service architecture, or a cloud architecture. In the embodiments of this application, an Android system of the layered architecture is used as an example to illustrate a software structure of the terminal device. FIG. 17 is a block diagram of a software structure of a terminal device according to an embodiment of this application.

In the layered architecture, software is divided into several layers, and each layer has a clear role and division of labor. The layers communicate with each other by using a software interface. In some embodiments, the Android system is divided into four layers, which are an application program layer, an application program framework layer, an Android runtime (Android runtime) and system library, and a kernel layer from top to bottom.

The application program layer may include a series of application program packages.

As shown in FIG. 17, the application program packages may include application programs such as phone, camera, gallery, calendar, call, map, navigation, WLAN, Bluetooth, music, video, and short message.

The application program framework layer provides an application programming interface (application programming interface, API) and a programming framework for application programs at the application program layer. The application program framework layer includes some predefined functions.

As shown in FIG. 17, the application program framework layer may include a window manager, a content provider, a view system, a phone manager, a resource manager, a notification manager, and the like.

The window manager is configured to manage a window program. The window manager may obtain a size of a display screen, determine whether a status bar exists, perform screen locking, take a screenshot, and the like.

The content provider is configured to store and obtain data, and enable the data to be accessed by an application program. The data may include a video, an image, audio, calls that are made and answered, a browsing history and bookmarks, an address book, and the like.

The view system includes visual controls such as a control for displaying text and a control for displaying a picture. The view system may be configured to create an application program. A display interface may include one or more views. For example, a display interface including a short message notification icon may include a view for displaying text and a view for displaying a picture.

The phone manager is configured to provide a communication function of the terminal device, for example, management of a call state (including answering, declining, or the like).

The resource manager provides various resources for an application program, for example, a localized character string, an icon, a picture, a layout file, and a video file.

The notification manager enables an application program to display notification information in the status bar, and may be configured to convey a notification-type message. The displayed notification information may automatically disappear after a short pause without a need to perform user interaction. For example, the notification manager is configured to notify download completion and give a message notification. The notification manager may alternatively be a notification that appears in a top status bar of a system in a form of a graph or scroll bar text, for example, a notification for an application program running in the background, or may be a notification that appears on a screen in a form of a dialog window. For example, text information is prompted in the status bar, a prompt tone is made, the terminal device vibrates, and the indicator light flashes.

The Android runtime includes a core library and a virtual machine. The Android runtime is responsible for scheduling and management of the Android system.

The kernel library includes two parts: a functional function that needs to be invoked in a java language and a kernel library of Android.

The application program layer and the application program framework layer are run in the virtual machine. The virtual machine executes java files at the application program layer and the application program framework layer as binary files. The virtual machine is configured to perform functions such as lifecycle management of an object, stack management, thread management, security and exception management, and garbage collection.

The system library may include a plurality of functional modules, for example, a surface manager (surface manager), a media library (Media Libraries), a three-dimensional graphics processing library (for example, an OpenGL ES), a 2D graphics engine (for example, an SGL), and the like.

The surface manager is configured to manage a display subsystem, and provide 2D and 3D layer fusion for a plurality of application programs.

The media library supports various commonly used audio, playback and recording in a video format, static image files, and the like. The media library may support a plurality of audio and video coding formats, for example, MPEG4, H.164, MP3, AAC, AMR, JPG, and PNG.

The three-dimensional graphics processing library is configured to implement three-dimensional graphics drawing, image rendering and synthesis, layer processing, and the like.

The 2D graphics engine is a drawing engine of 2D drawing.

The kernel layer is a layer between hardware and software. The kernel layer includes at least a display driver, a camera driver, an audio driver, and a sensor driver.

With reference to a scenario in which the tablet computer 100 processes a handwriting, the following describes an example of a working procedure of software and hardware of the tablet computer 100.

When the touch sensor 180K receives a touch operation, a corresponding hardware interruption is sent to the kernel layer. The kernel layer processes the touch event into a raw input event, and the raw input event is stored at the kernel layer. The application program framework layer obtains the raw input event from the kernel layer, to process a corresponding handwriting by invoking the resource manager at the application program framework layer.

Figure 18:
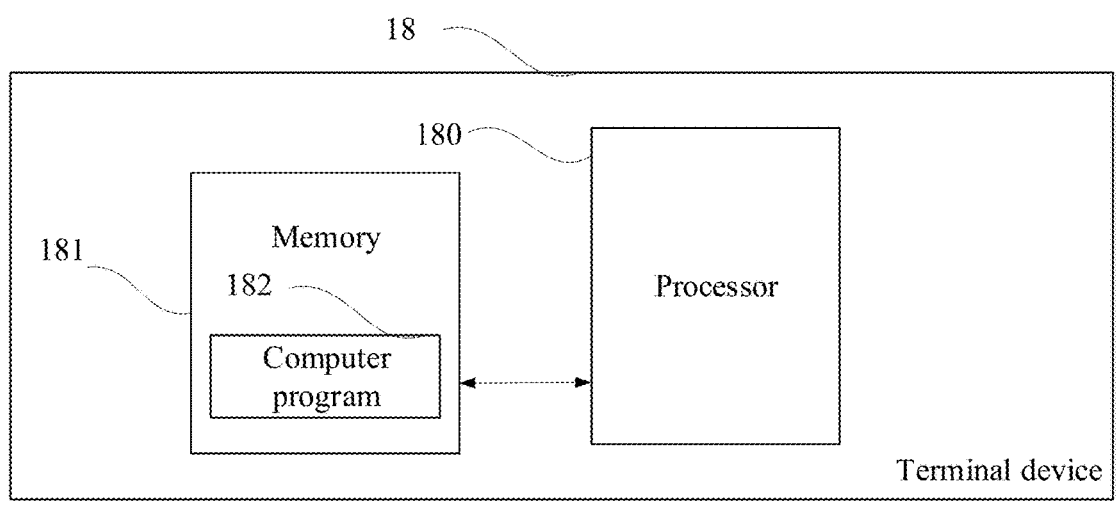
FIG. 18 is a schematic diagram of a hardware structure of a terminal device according to an embodiment of this application.

FIG. 18 is a schematic structural diagram of a terminal device according to an embodiment of this application. As shown in FIG. 18, the terminal device 18 in this embodiment includes: at least one processor 180 (only one processor is shown in FIG. 18) and a memory 181, where the memory 181 stores a computer program 182 that may be run on the processor 180. The processor 180 implements, when executing the computer program 182, the steps in the foregoing various handwriting processing method embodiments, for example, S201 and S202 shown in FIG. 2. Alternatively, the processor 180 implements, when executing the computer program 182, functions of the modules/units in the foregoing various apparatus embodiments, for example, functions of the modules 151 to 154 shown in FIG. 15.

The terminal device 18 may be a computing device, for example, a desktop computer, a notebook computer, a palmtop computer, or a cloud server. The terminal device may include but is not limited to the processor 180 and the memory 181. A person skilled in the art may understand that FIG. 18 is merely an example of the terminal device 18 and does not constitute a limitation to the terminal device 18, and the terminal device may include more or fewer components than those shown in the figure, or a combination of some components, or different components. For example, the terminal device may further include an input sending device, a network access device, a bus, or the like.

The processor 180 may be a central processing unit (Central Processing Unit, CPU), another general-purpose processor, a digital signal processor (Digital Signal Processor, DSP), an application-specific integrated circuit (Application Specific Integrated Circuit, ASIC), a field-programmable gate array (Field-Programmable Gate Array, FPGA) or another programmable logic device, a discrete gate or transistor logic device, a discrete hardware component, or the like. The general-purpose processor may be a microprocessor, or the processor may be any conventional processor.

In some embodiments, the memory 181 may be an internal storage unit of the terminal device 18, for example, a hard disk or an internal memory of the terminal device 18. The memory 181 may alternatively be an external storage device of the terminal device 18, for example, a pluggable hard disk equipped for the terminal device 18, a smart media card (Smart Media Card, SMC), a secure digital (Secure Digital, SD) card, or a flash card (Flash Card). Further, the memory 181 may alternatively include bot an internal storage unit and an external storage device of the terminal device 18. The memory 181 is configured to store an operating system, an application program, a boot loader (Boot Loader), data, and another program, for example, program code of the computer program. The memory 181 may further be configured to temporarily store data that has been sent or that is to be sent.

In addition, a person skilled in the art may clearly understand that, for the purpose of convenient and brief description, only division of the foregoing functional units and modules is used as an example for description. During actual application, the functions may be allocated to and completed by different function units and modules as required. That is, an internal structure of the apparatus is divided into different functional units or modules, to complete all or some of the functions described above. In addition, the functional units in the embodiments of this application may be integrated into one processing unit, or each of the units may exist alone physically, or two or more units may be integrated into one unit. The integrated unit may be implemented in a form of hardware or a software functional unit.

An embodiment of this application further provides a terminal device. The terminal device includes at least one memory, at least one processor, and a computer program stored in the at least one memory and executable on the at least one processor. When the processor executes the computer program, the terminal device is caused to implement the steps in the foregoing method embodiments.

An embodiment of this application further provides a computer-readable storage medium. The computer-readable storage medium stores a computer program, and when the computer program is executed by a processor, the steps in the foregoing method embodiments may be implemented.

An embodiment of this application provides a computer program product, the computer program product, when run on a terminal device, causing the terminal device to implement the steps in the foregoing method embodiments.

An embodiment of this application further provides a chip system. The chip system includes a processor, and the processor is coupled to a memory and configured to execute a computer program stored in the memory, to implement the steps in the foregoing method embodiments.

When the integrated module/unit is implemented in the form of a software functional unit and sold or used as an independent product, the integrated module/unit may be stored in a computer-readable storage medium. Based on such understanding, all or some of the processes of the methods in the embodiments in this application may be implemented by a computer program instructing relevant hardware. The computer program may be stored in a computer-readable storage medium. During execution of the computer program by a processor, the steps of the foregoing method embodiments may be implemented. The computer program includes computer program code. The computer program code may be in the form of source code, object code, an executable file, some intermediate forms, or the like. The computer-readable storage medium may include: any entity or apparatus that can carry the computer program code, a recording medium, a USB flash drive, a removable hard disk, a magnetic disk, an optical disc, a computer memory, a read-only memory (Read-Only Memory, ROM), a random access memory (Random Access Memory, RAM), an electrical carrier signal, a telecommunication signal, a software distribution medium, or the like.

In the foregoing embodiments, the descriptions of the embodiments have different emphases. As for parts that are not described in detail in one embodiment, refer to the related descriptions of other embodiments.

A person of ordinary skill in the art may be aware that, the units and the algorithm steps in the examples described with reference to the embodiments disclosed in this specification can be implemented by using electronic hardware or a combination of computer software and electronic hardware. Whether these functions are performed in a hardware or software manner depends on particular applications and design constraints of the technical solutions. A person skilled in the art may use different methods to implement the described functions for each particular application, but it should not be considered that the implementation goes beyond the scope of this application.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

The foregoing embodiments are only intended for describing the technical solutions of this disclosure rather than limiting this application. Although this application is described in detail with reference to the foregoing embodiments, a person of ordinary skill in the art should understand that modifications may still be made to the technical solutions recorded in the foregoing embodiments or equivalent replacements may be made to some technical features thereof, and the modifications or replacements do not cause the essence of corresponding technical solutions to depart from the spirit and scope of the technical solutions of the embodiments of this application. Therefore, the modifications or replacements still fall within the protection scope of this application.

What is claimed is:

1. A handwriting processing method, applied to a terminal device, the terminal device comprising a handwriting module, the handwriting module comprising a plurality of regions, the handwriting module being provided for a stylus to input handwriting content, and the method comprising:
   obtaining a first pressure value within a preset time range, wherein the first pressure value is a pressure value applied by the stylus to the handwriting module, and an end moment of the preset time range is a current moment;
   obtaining a latest first signal strength, wherein the first signal strength is a signal strength of a coupling signal between the terminal device and the stylus;
   determining a region in which the stylus is located on the handwriting module at the current moment, using the region as a first region, and obtaining a target critical threshold associated with the first region;
   searching, when the target critical threshold associated with the first region is not obtained, for a critical threshold associated with each region within a preset region range adjacent to the first region;
   determining the target critical threshold corresponding to the first region based on one or more found critical thresholds;
   identifying, based on the first pressure value, the first signal strength, and the target critical threshold, whether the stylus moves away from the handwriting module; and
   stopping, when identifying that the stylus moves away from the handwriting module, displaying to-be-displayed handwriting content inputted by the stylus on the handwriting module within a first time range after the current moment.

2. The handwriting processing method according to claim 1, wherein the identifying, based on the first pressure value-, the first signal strength, and the target critical threshold, whether the stylus moves away from the handwriting module comprises:
   detecting a change trend of the first pressure value within the preset time range; and
   determining, when the detected change trend is descending and the first signal strength is less than or equal to a target critical threshold, that the stylus moves away from the handwriting module.

3. The handwriting processing method according to claim 2, wherein the detecting a change trend of the first pressure value within the preset time range comprises:
   comparing, by using every two adjacent first pressure values in all first pressure values obtained within the preset time range as a unit, every two adjacent first pressure values respectively;
   counting, when comparison results comprise first-type results and second-type results, a quantity of the first-type results, and obtaining a difference between two adjacent first pressure values in each second-type result, wherein the first-type result refers to that a pressure value obtained at a former time point is greater than a pressure value obtained at a later time point in two adjacent first pressure values, and the second-type result refers to that a pressure value obtained at a former time point is less than or equal to a pressure value obtained at a later time point in two adjacent first pressure values; and
   determining that the change trend is descending when the quantity of the first-type results is greater than a preset decreasing threshold and differences corresponding to all the second-type results are less than a preset sudden change threshold.

4. The handwriting processing method according to claim 2, wherein the detecting a change trend of the first pressure value within the preset time range comprises:
   performing function fitting on a plurality of pressure values obtained with the preset time range to obtain a corresponding pressure change function; and
   determining, if the pressure change function is a decreasing function, that the change trend of the first pressure value is descending.

5. The handwriting processing method according to claim 1, wherein the determining the target critical threshold corresponding to the first region based on one or more found critical thresholds comprises:
   screening, when critical thresholds associated with a plurality of regions are found within the preset region range, out a second region that is closest to the first region from the plurality of found regions; and
   using, when one second region is screened out, a critical threshold associated with the second region as the target critical threshold corresponding to the first region.

6. The handwriting processing method according to claim 1, wherein the determining the target critical threshold corresponding to the first region based on one or more found critical thresholds comprises:
   screening, when critical thresholds associated with a plurality of regions are found within the preset region range, out a second region that is closest to the first region from the plurality of found regions; and
   using, when a plurality of second regions are screened out, a mean value of critical thresholds associated with all the second regions as the target critical threshold corresponding to the first region.

7. The handwriting processing method according to claim 1, wherein a manner for determining the target critical threshold comprises:
   obtaining a latest second pressure value, a latest second signal strength, and a latest target tilt angle between the stylus and the handwriting module, wherein the second pressure value is a pressure value applied by a user to the stylus or a pressure value applied by the stylus to the handwriting module, and the second signal strength is a signal strength of a coupling signal between the terminal device and the stylus;
   obtaining a mapping relationship among a pressure value, a tilt angle, and a signal strength;
   determining a residual signal strength based on the second pressure value, the target tilt angle, and the mapping relationship;
   removing the residual signal strength from the second signal strength to obtain an initial signal strength; and
   determining the target critical threshold based on the initial signal strength.

8. The handwriting processing method according to claim 1, wherein a manner for determining the target critical threshold comprises:
- obtaining a latest second pressure value, a latest second signal strength, and a latest target tilt angle between the stylus and the handwriting module, wherein the second pressure value is a pressure value applied by a user to the stylus or a pressure value applied by the stylus to the handwriting module, and the second signal strength is a signal strength of a coupling signal between the terminal device and the stylus;
- determining a region in which the stylus is located on the handwriting module at the current moment, and using the region as a second region;
- obtaining a mapping relationship associated with the second region, wherein the mapping relationship is a mapping relationship among a pressure value, a tilt angle, and a signal strength;
- determining a residual signal strength based on the second pressure value, the target tilt angle, and the mapping relationship;
- removing the residual signal strength from the second signal strength to obtain an initial signal strength; and
- determining the target critical threshold associated with the second region based on the initial signal strength.

9. The handwriting processing method according to claim 8, wherein the mapping relationship is a function relationship among a pressure value, a tilt angle, and a signal quantity.

10. A handwriting processing method, applied to a terminal device, the terminal device comprising a handwriting module, the handwriting module comprising a plurality of regions, the handwriting module being provided for a stylus to input handwriting content, and the method comprising:
- obtaining a first pressure value within a preset time range, wherein the first pressure value is a pressure value applied by the stylus to the handwriting module, and an end moment of the preset time range is a current moment;
- detecting a change trend of the first pressure value within the preset time range;
- obtaining a latest first signal strength, wherein the first signal strength is a signal strength of a coupling signal between the terminal device and the stylus;
- determining a region in which the stylus is located on the handwriting module at the current moment, using the region as a first region, and obtaining a target critical threshold associated with the first region;
- searching, when the target critical threshold associated with the first region is not obtained, for a critical threshold associated with each region within a preset region range adjacent to the first region;
- determining the target critical threshold corresponding to the first region based on one or more found critical thresholds;
- identifying, based on the detected change trend of the first pressure value within the preset time range, the first signal strength, and the target critical threshold, whether the stylus moves away from the handwriting module; and
- stopping, when identifying that the stylus moves away from the handwriting module, displaying to-be-displayed handwriting content inputted by the stylus on the handwriting module within a first time range after the current moment.

11. The handwriting processing method according to claim 10, wherein the identifying, based on the first pressure value, the first signal strength, and the target critical threshold, whether the stylus moves away from the handwriting module comprises:
- determining, when the detected change trend is descending and the first signal strength is less than or equal to the target critical threshold, that the stylus moves away from the handwriting module.

12. The handwriting processing method according to claim 10, wherein the determining the target critical threshold corresponding to the first region based on one or more found critical thresholds comprises:
- screening, when critical thresholds associated with a plurality of regions are found within the preset region range, out a second region that is closest to the first region from the plurality of found regions; and
- using, when one second region is screened out, a critical threshold associated with the second region as the target critical threshold corresponding to the first region.

13. The handwriting processing method according to claim 10, wherein the determining the target critical threshold corresponding to the first region based on one or more found critical thresholds comprises:
- screening, when critical thresholds associated with a plurality of regions are found within the preset region range, out a second region that is closest to the first region from the plurality of found regions; and
- using, when a plurality of second regions are screened out, a mean value of critical thresholds associated with all the second regions as the target critical threshold corresponding to the first region.

14. A terminal device, the terminal device comprising a memory and a processor, wherein the memory stores a computer program executable on the processor, and the processor, when executing the computer program, cause the terminal device to:
- obtain a first pressure value within a preset time range, wherein the first pressure value is a pressure value applied by a stylus to a handwriting module, and an end moment of the preset time range is a current moment;
- obtain a latest first signal strength, wherein the first signal strength is a signal strength of a coupling signal between the terminal device and the stylus;
- determine a region in which the stylus is located on the handwriting module at the current moment, using the region as a first region, and obtaining a target critical threshold associated with the first region;
- search, when the target critical threshold associated with the first region is not obtained, for a critical threshold associated with each region within a preset region range adjacent to the first region;
- determine the target critical threshold corresponding to the first region based on one or more found critical thresholds;
- identify, based on the first pressure value, the first signal strength, and the target critical threshold, whether the stylus moves away from the handwriting module; and
- stop, when identifying that the stylus moves away from the handwriting module, displaying to-be-displayed handwriting content inputted by the stylus on the handwriting module within a first time range after the current moment.

15. The terminal device according to claim 14, wherein the processor, when executing the computer program, further cause the terminal device to:
- obtain a first pressure value within a preset time range, wherein the first pressure value is a pressure value applied by the stylus to the handwriting module, and an end moment of the preset time range is a current moment;

obtain a latest first signal strength, wherein the first signal strength is a signal strength of a coupling signal between the terminal device and the stylus;

determine a region in which the stylus is located on the handwriting module at the current moment, using the region as a first region, and obtaining a target critical threshold associated with the first region;

search, when the target critical threshold associated with the first region is not obtained, for a critical threshold associated with each region within a preset region range adjacent to the first region;

determine the target critical threshold corresponding to the first region based on one or more found critical thresholds;

identify, based on the first pressure value, the first signal strength, and the target critical threshold, whether the stylus moves away from the handwriting module; and stop, when identifying that the stylus moves away from the handwriting module, displaying to-be-displayed handwriting content inputted by the stylus on the handwriting module within a first time range after the current moment.

16. The terminal device according to claim 14, wherein the processor, when executing the computer program, further cause the terminal device to:

obtain a latest second pressure value, a latest second signal strength, and a latest target tilt angle between a stylus and the handwriting module, wherein the second pressure value is a pressure value applied by a user to the stylus or a pressure value applied by the stylus to the handwriting module, and the second signal strength is a signal strength of a coupling signal between the terminal device and the stylus;

obtain a mapping relationship among a pressure value, a tilt angle, and a signal strength;

determine a residual signal strength based on the second pressure value, the target tilt angle, and the mapping relationship;

remove the residual signal strength from the second signal strength to obtain an initial signal strength; and determine a target critical threshold based on the initial signal strength, wherein the target critical threshold is used for performing comparison with a first signal strength of a latest coupling signal between the terminal device and the stylus, to identify whether the stylus moves away from the handwriting module.

17. The terminal device according to claim 16, wherein the handwriting module comprises a plurality of regions; the obtain a mapping relationship among a pressure value, a tilt angle, and a signal strength comprises:

determine a region in which the stylus is located on the handwriting module at a current moment, and using the region as a second region; and obtain a mapping relationship associated with the second region, wherein the mapping relationship is a mapping relationship among a pressure value, a tilt angle, and a signal strength; and the determine a target critical threshold based on the initial signal strength comprises:

determine a target critical threshold associated with the second region based on the initial signal strength.

\* \* \* \* \*